US008194256B2

(12) United States Patent
Kobayashi

(10) Patent No.: US 8,194,256 B2
(45) Date of Patent: Jun. 5, 2012

(54) IMAGE FORMING APPARATUS AND IMAGE FORMING SYSTEM FOR MANAGING A PLURALITY OF TRAYS

(75) Inventor: Junji Kobayashi, Fukushima (JP)

(73) Assignee: Oki Data Corporation, Tokyo (JP)

( * ) Notice: Subject to any disclaimer, the term of this patent is extended or adjusted under 35 U.S.C. 154(b) by 799 days.

(21) Appl. No.: 12/332,484

(22) Filed: Dec. 11, 2008

(65) Prior Publication Data

US 2009/0153910 A1 Jun. 18, 2009

(30) Foreign Application Priority Data

Dec. 14, 2007 (JP) ................................ 2007-323405

(51) Int. Cl.
*G06K 15/00* (2006.01)
*G06F 3/12* (2006.01)

(52) U.S. Cl. ........................................ 358/1.12; 358/1.1

(58) Field of Classification Search ........................ None
See application file for complete search history.

(56) References Cited

U.S. PATENT DOCUMENTS

| | | | | |
|---|---|---|---|---|
| 5,435,544 | A * | 7/1995 | Mandel | 271/298 |
| 5,975,515 | A * | 11/1999 | Capri et al. | 271/9.11 |
| 6,937,354 | B2 * | 8/2005 | Kobayashi et al. | 358/1.13 |
| 2002/0191205 | A1 * | 12/2002 | Stringham | 358/1.13 |
| 2004/0156064 | A1 * | 8/2004 | Owen et al. | 358/1.13 |
| 2004/0199651 | A1 * | 10/2004 | Kobayashi | 709/230 |
| 2006/0056859 | A1 | 3/2006 | Otani | |
| 2008/0232835 | A1 | 9/2008 | Ota et al. | |

FOREIGN PATENT DOCUMENTS

| | | | |
|---|---|---|---|
| JP | 11-227967 | A | 8/1999 |
| JP | 2001166642 | A | 6/2001 |
| JP | 2002-240961 | A | 8/2002 |
| JP | 2006-110998 | A | 4/2006 |
| JP | 2006-151608 | A | 6/2006 |
| JP | 2007157028 | A | 6/2007 |
| JP | 2007-304881 | A | 11/2007 |

* cited by examiner

*Primary Examiner* — Gabriel Garcia
(74) *Attorney, Agent, or Firm* — Panitch Schwarze Belisario & Nadel LLP

(57) ABSTRACT

An image forming apparatus is supplied capable of feeding paper or ejecting paper to position which is desired by user. In the image forming apparatus which has medium accommodating sections, a first storing section stores accommodating section selection data correspondence information in which first medium accommodating section selection data assigned to other image forming apparatus corresponds to second medium accommodating section selection data assigned to the image forming apparatus serving as self apparatus; a receiving section receives the first medium accommodating section selection data and image data from an upper apparatus; a correcting section corrects the first medium accommodating section selection data received from the upper apparatus into second medium accommodating section selection data on the basis of the accommodating section selection data correspondence information stored in the first storing section; and a selecting section selects medium accommodating section on the basis of the second medium accommodating section selection data obtained by the correcting section.

9 Claims, 33 Drawing Sheets

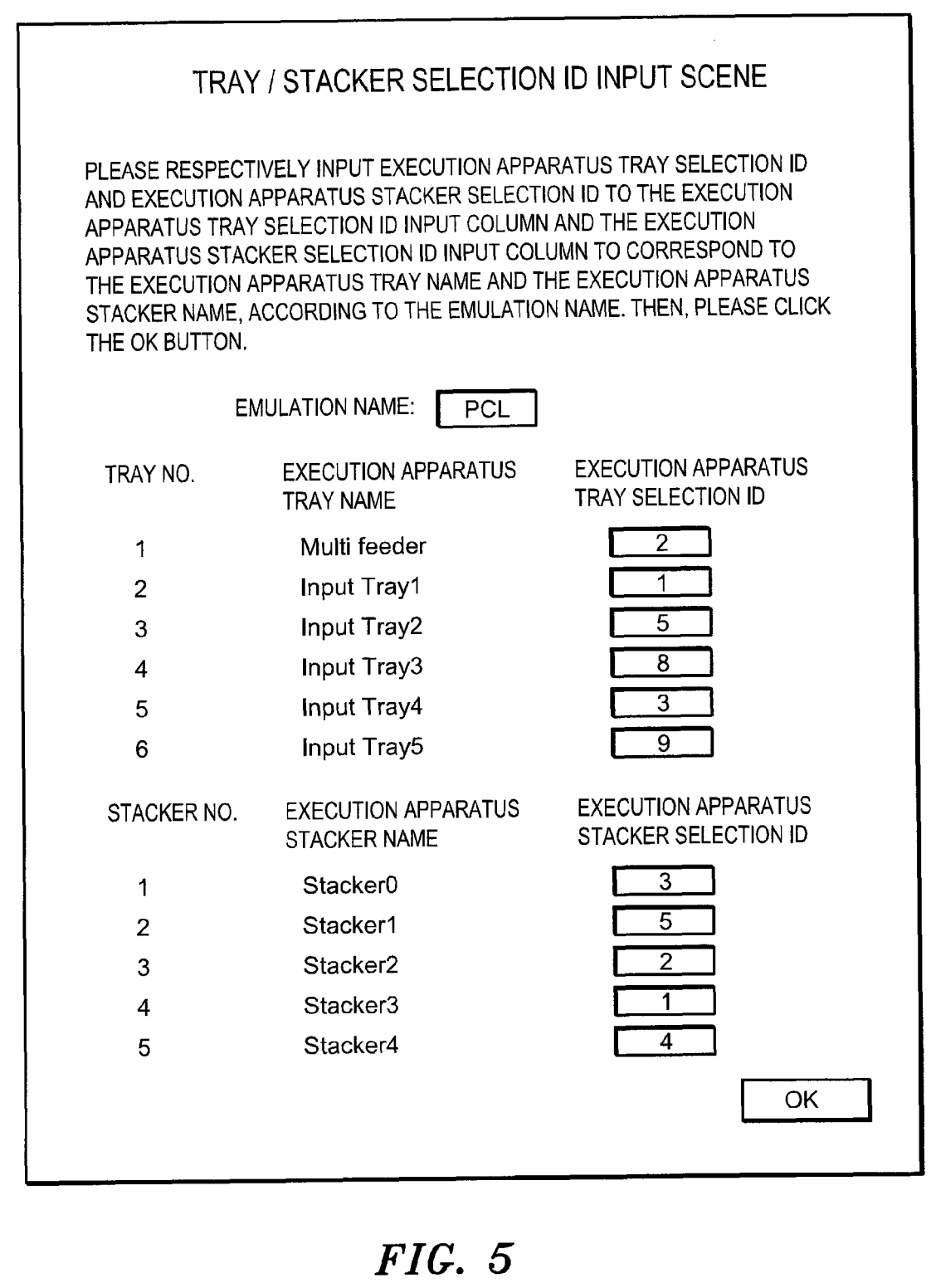

TRAY / STACKER SELECTION ID INPUT SCENE

PLEASE RESPECTIVELY INPUT EXECUTION APPARATUS TRAY SELECTION ID AND EXECUTION APPARATUS STACKER SELECTION ID TO THE EXECUTION APPARATUS TRAY SELECTION ID INPUT COLUMN AND THE EXECUTION APPARATUS STACKER SELECTION ID INPUT COLUMN TO CORRESPOND TO THE EXECUTION APPARATUS TRAY NAME AND THE EXECUTION APPARATUS STACKER NAME, ACCORDING TO THE EMULATION NAME. THEN, PLEASE CLICK THE OK BUTTON.

EMULATION NAME: PCL

| TRAY NO. | EXECUTION APPARATUS TRAY NAME | EXECUTION APPARATUS TRAY SELECTION ID |
|---|---|---|
| 1 | Multi feeder | 2 |
| 2 | Input Tray1 | 1 |
| 3 | Input Tray2 | 5 |
| 4 | Input Tray3 | 8 |
| 5 | Input Tray4 | 3 |
| 6 | Input Tray5 | 9 |

| STACKER NO. | EXECUTION APPARATUS STACKER NAME | EXECUTION APPARATUS STACKER SELECTION ID |
|---|---|---|
| 1 | Stacker0 | 3 |
| 2 | Stacker1 | 5 |
| 3 | Stacker2 | 2 |
| 4 | Stacker3 | 1 |
| 5 | Stacker4 | 4 |

OK

*FIG. 5*

118a ( STANDARD APPARATUS TRAY SELECTION ID REFERENCE LIST DB )

| EMULATION NAME | TRAY NO. | STANDARD APPARATUS TRAY NAME | STANDARD APPARATUS TRAY SELECTION ID |
|---|---|---|---|
| SIDM | | | |

| EMULATION NAME | TRAY NO. | STANDARD APPARATUS TRAY NAME | STANDARD APPARATUS TRAY SELECTION ID |
|---|---|---|---|
| PS | | | |

| EMULATION NAME | TRAY NO. | STANDARD APPARATUS TRAY NAME | STANDARD APPARATUS TRAY SELECTION ID |
|---|---|---|---|
| PCL | | | |
| | 1 | Multi Purpose Feeder | 9 |
| | 2 | Manual Feeder | 3 |
| | 3 | Front Feeder | 5 |
| | 4 | Input Tray1 | 2 |
| | 5 | Input Tray2 | 4 |
| | 6 | Input Tray3 | 8 |

*FIG. 6A*

118b ( STANDARD APPARATUS STACKER SELECTION ID REFERENCE LIST DB )

| EMULATION NAME | STACKER NO. | STANDARD APPARATUS STACKER NAME | STANDARD APPARATUS STACKER SELECTION ID |
|---|---|---|---|
| SIDM | | | |

| EMULATION NAME | STACKER NO. | STANDARD APPARATUS STACKER NAME | STANDARD APPARATUS STACKER SELECTION ID |
|---|---|---|---|
| PS | | | |

| EMULATION NAME | STACKER NO. | STANDARD APPARATUS STACKER NAME | STANDARD APPARATUS STACKER SELECTION ID |
|---|---|---|---|
| PCL | | | |
| | 1 | Output1 | 7 |
| | 2 | Output2 | 4 |
| | 3 | Output3 | 5 |
| | 4 | Output4 | 3 |
| | 5 | Output5 | 6 |

*FIG. 6B*

118c ( TRAY SELECTION ID CHANGE TABLE )

| TRAY NO. | STANDARD APPARATUS TRAY SELECTION ID | EXECUTION APPARATUS TRAY SELECTION ID |
|---|---|---|
| 1 | 9 | 2 |
| 2 | 3 | 1 |
| 3 | 5 | 5 |
| 4 | 2 | 8 |
| 5 | 4 | 3 |
| 6 | 8 | 9 |

*FIG. 7A*

118d ( STACKER SELECTION ID CHANGE TABLE )

| STACKER NO. | STANDARD APPARATUS STACKER SELECTION ID | EXECUTION APPARATUS STACKER SELECTION ID |
|---|---|---|
| 1 | 7 | 3 |
| 2 | 4 | 5 |
| 3 | 5 | 2 |
| 4 | 3 | 1 |
| 5 | 6 | 4 |

*FIG. 7B*

SELECTION ID CONFIRMATION PAGE

[ PRINT JOB DATA ANALYSIS RESULT ]

( 1 ) PDL EMULATION KIND: PCL ( 2 ) PDL STANDARD APPARATUS TRAY SELECTION ID: 4

( 3 ) PDL STANDARD APPARATUS STACKER SELECTION ID: 5

[ ATTRIBUTE OF PAPER FEEDING UNIT / PAPER EJECTING UNIT FURNISHED IN THE IMAGE FORMING APPARATUS ]

A

| PAPER FEEDING UNIT<br>EXECUTION APPARATUS TRAY NAME | RESPECTIVE EXECUTION APPARATUS TRAY SELECTION ID OF EMULATIONS<br>PCL | PS | SIDM |
|---|---|---|---|
| ( 1 ) Multi Feeder | 9 | 4 | 5 |
| ( 2 ) Input Tray1 | 2 | 5 | 9 |
| ( 3 ) Input Tray2 | 1 | 5 | 9 |
| ( 4 ) Input Tray3 | 5 | 5 | 9 |
| ( 5 ) Input Tray4 | 8 | 5 | 9 |
| ( 6 ) Input Tray5 | 3 | 5 | 9 |

B

| PAPER EJECTING UNIT<br>EXECUTION APPARATUS STACKER NAME | RESPECTIVE EXECUTION APPARATUS STACKER SELECTION ID OF EMULATIONS<br>PCL | PS | SIDM |
|---|---|---|---|
| ( 1 ) Stacker0 | 3 | 9 | 5 |
| ( 2 ) Stacker1 | 5 | 8 | 6 |
| ( 3 ) Stacker2 | 2 | 7 | 9 |
| ( 4 ) Stacker3 | 1 | 5 | 8 |
| ( 5 ) Stacker4 | 4 | 6 | 7 |

*FIG. 11*

118f ( EXECUTION APPARATUS TRAY SELECTION ID REFERENCE LIST )

| EXECUTION APPARATUS TRAY NAME | EXECUTION APPARATUS TRAY SELECTION ID |
|---|---|
| Multi Feeder | 9 |
| Input Tray1 | 2 |
| Input Tray2 | 1 |
| Input Tray3 | 5 |
| Input Tray4 | 8 |
| Input Tray5 | 3 |

*FIG. 18A*

118g ( EXECUTION APPARATUS STACKER SELECTION ID REFERENCE LIST )

| EXECUTION APPARATUS STACKER NAME | EXECUTION APPARATUS STACKER SELECTION ID |
|---|---|
| Stacker0 | 2 |
| Stacker1 | 3 |
| Stacker2 | 5 |
| Stacker3 | 1 |
| Stacker4 | 4 |

*FIG. 18B*

118j (PAPER SETTING EXISTENCE / INEXISTENCE DATA LIST)

| TRAY NO. | EXISTENCE / INEXISTENCE OF PAPER SETTING INFORMATION |
|---|---|
| 1 | INEXISTENCE |
| 2 | INEXISTENCE |
| 3 | INEXISTENCE |
| 4 | EXISTENCE |
| 5 | INEXISTENCE |
| 6 | INEXISTENCE |

*FIG. 30*

IMAGE FORMING APPARATUS AND IMAGE FORMING SYSTEM FOR MANAGING A PLURALITY OF TRAYS

FIELD OF THE INVENTION

The invention relates to an image forming apparatus in which a plurality of trays or a plurality of stackers are supplied, and relates to an image forming system comprising the image forming apparatus.

BACKGROUND OF THE INVENTION

As an image forming apparatus, it comprises a paper feeding section including a plurality of trays, and a paper ejecting section including a plurality of stackers. In the past, the image forming apparatus receives print JOB data of printer language form called PDL (Page Description Language); obtains paper feeding position designation information and paper ejecting position designation information that are described in the print JOB data and are coded; and selects one of the plurality of trays or one of the plurality of stackers on the basis of the paper feeding position designation information and the paper ejecting position designation information, so as to perform a print process (For example, it may refer to Patent document 1).

Patent document 1: Japan patent publication of No. Hei 11-227967.

In an image forming system comprising a plurality of image forming apparatuses to print image data described in print JOB data received from an upper apparatus, an image forming apparatus is additively furnished whose paper feeding position designation information described in the print JOB data or whose paper ejecting position designation information described in the print JOB data is different from other image forming apparatus.

However, in the conventional image forming system, there is a such problem, that is, when such image forming apparatus whose paper feeding position designation information described in the print JOB data or whose paper ejecting position designation information described in the print JOB data is different from other image forming apparatus, is additively furnished, in the case that user sends a print request from an upper apparatus to the additively furnished image forming apparatus, because paper feeding position or paper ejecting position of the additively furnished image forming apparatus is different from that of other image forming apparatus, paper is fed from a tray that is different from a paper feeding position that is desired by user, or, paper is ejected to a stacker that is different from paper ejecting position that is desired by user.

SUMMARY OF THE INVENTION

It is, therefore, an object of the invention to provide an image forming apparatus and an image forming system capable of solving the above problem.

The invention has an object to set location of paper feed accommodation portion/paper ejection accommodation portion that depends upon image forming apparatus into location desired by user while using the same printer language.

That is, in the case that an image forming apparatus whose paper feeding position designation information described in the print JOB data or whose paper ejecting position designation information described in the print JOB data is different from other image forming apparatus, is additively furnished, paper can be fed from a paper feeding position that is desired by user, or, paper can be ejected to a paper ejecting position that is desired by user.

An aspect of the invention is to provide an image forming apparatus which has medium accommodating sections, comprising:

a first storing section that stores accommodating section selection data correspondence information in which first medium accommodating section selection data assigned to other image forming apparatus corresponds to second medium accommodating section selection data assigned to the image forming apparatus serving as self apparatus;

a receiving section that receives the first medium accommodating section selection data and image data from an upper apparatus;

a correcting section that corrects the first medium accommodating section selection data received from the upper apparatus into second medium accommodating section selection data on the basis of the accommodating section selection data correspondence information stored in the first storing section; and a selecting section that selects medium accommodating section on the basis of the second medium accommodating section selection data obtained by the correcting section.

Another aspect of the invention is to provide an image forming system, comprising an upper apparatus; and an image forming apparatus which serves as a self apparatus and has medium accommodating sections, wherein the upper apparatus includes:

a displaying section that displays a display scene to input second medium accommodating section selection data assigned to the self apparatus;

a first storing section that stores first medium accommodating section selection data assigned to other image forming apparatus;

an accommodating section selection data correspondence information generating section that generates accommodating section selection data correspondence information in which the first medium accommodating section selection data stored in the first storing section is related to the second medium accommodating section selection data inputted to the display scene, with respect to respective medium accommodating sections; and a sending section that sends the accommodating section selection data correspondence information generated by the accommodating section selection data correspondence information generating section, to the image forming apparatus; and wherein the image forming apparatus includes:

a registering section that registers the accommodating section selection data correspondence information received from the upper apparatus;

a correcting section that corrects the first medium accommodating section selection data received from the upper apparatus into second medium accommodating section selection data on the basis of the accommodating section selection data correspondence information stored in the registering section; and a selecting section that selects medium accommodating section on the basis of the second medium accommodating section selection data obtained by the correcting section.

The Effect of the Present Invention

According to the invention, the first medium accommodating portion selection information that is received from the upper apparatus is corrected into the second medium accommodating portion selection information through the correcting section on the basis of the accommodating portion selection information stored in the first storing section; the selecting section selects medium accommodating portion on the basis of the second medium accommodating portion selection information. Therefore, in the case that the image forming apparatus to which the second medium accommodating portion selection information is assigned that is different from the first medium accommodating portion selection information being assigned to other image forming apparatus, it is possible to feed paper from a medium accommodating portion that is desired by user and to eject paper to a medium accommodating portion that is desired by user.

The above and other objects and features of the present invention will become apparent from the following detailed description and the appended claims with reference to the accompanying drawings.

BRIEF DESCRIPTION OF THE DRAWINGS

FIG. 5 is a diagram showing an example of tray/stacker selection ID input scene;

FIG. 6A is a diagram to explain standard apparatus tray selection ID reference list in FIG. 3;

FIG. 6B is a diagram to explain standard apparatus stacker selection ID reference list in FIG. 3;

FIG. 7A is a diagram showing an example of tray selection ID change table in FIG. 3;

FIG. 7B is a diagram showing an example of stacker selection ID change table in FIG. 3;

FIG. 11 is a diagram to explain content of selection ID confirmation page;

FIG. 18A is a diagram to explain execution apparatus tray selection ID reference list in FIG. 14;

FIG. 18B is a diagram to explain execution apparatus stacker selection ID reference list in FIG. 14;

FIG. 30 is a diagram showing an example of paper setting existence/inexistence information data list;

DETAILED DESCRIPTION OF THE PREFERRED EMBODIMENTS

Embodiments of the invention will be described in detail hereinbelow with reference to the drawings.

Embodiment 1

Figure 1:
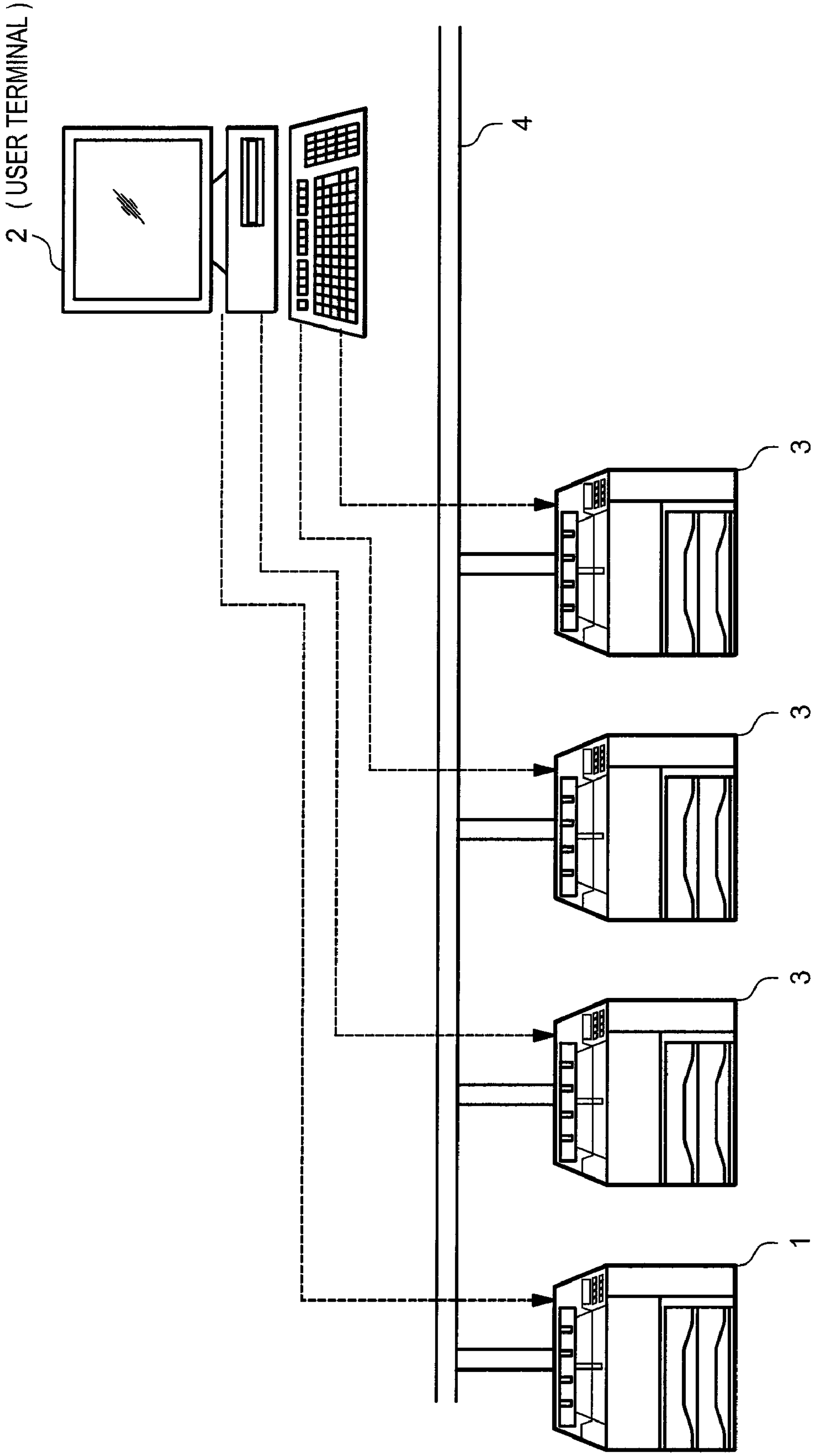
FIG. 1 is a diagram showing a structure of an image forming system comprising image forming apparatus in embodiment 1 of the present invention.
Figure 2:
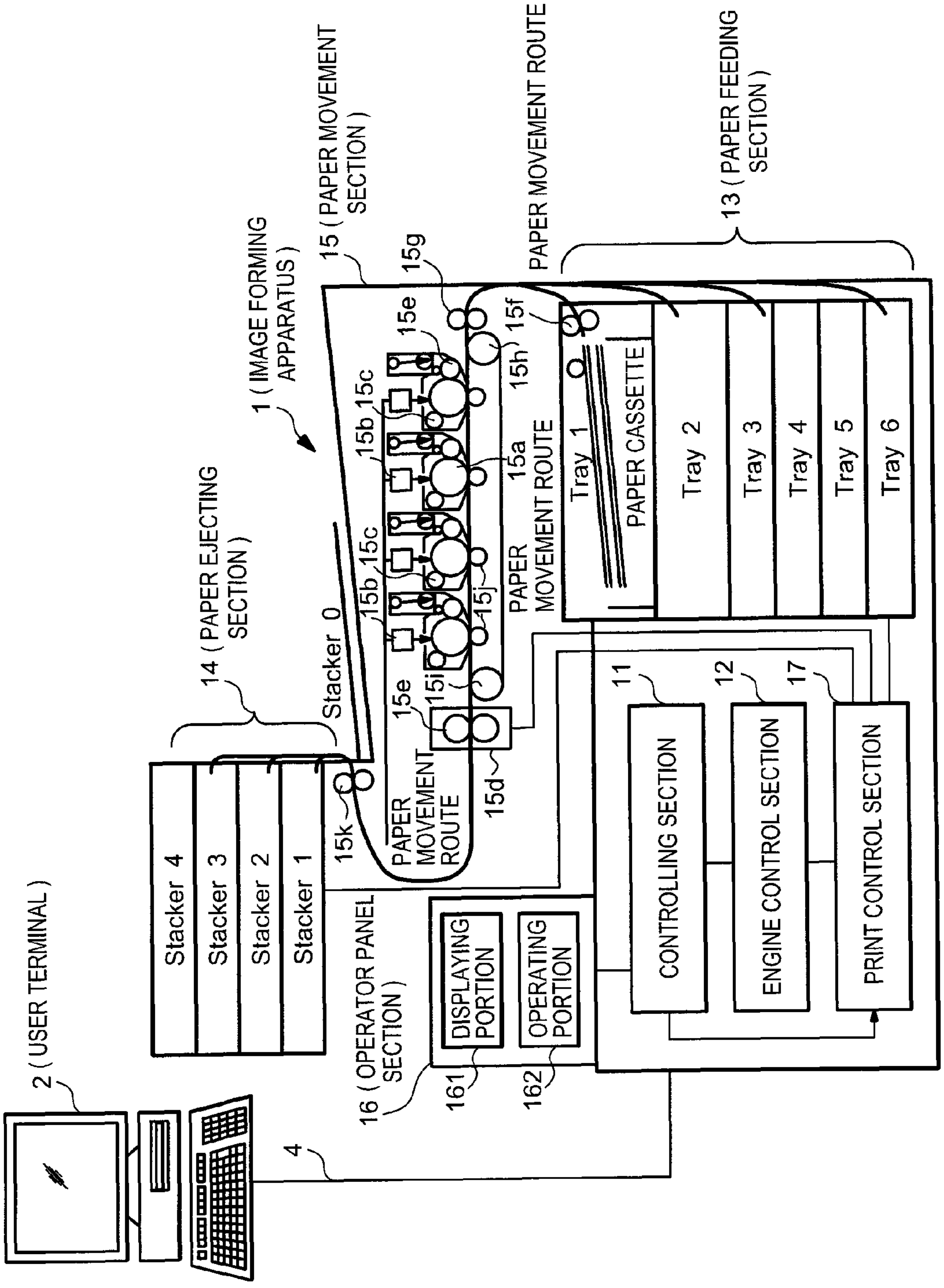
FIG. 2 is a diagram showing a summary structure of an image forming apparatus in embodiment 1 of the present invention.

FIG. 1 is a diagram showing a structure of an image forming system comprising image forming apparatus in embodiment 1 of the present invention; and FIG. 2 is a diagram showing a summary structure of an image forming apparatus in embodiment 1 of the present invention.

As shown by FIG. 1, an image forming apparatus 1 of the embodiment 1, together with plural image forming apparatuses (hereinafter: they are called “standard image forming apparatus”) 3 that interpret the same printer language (PDL (PCL, PS and the like), SIDM), is connected with a user terminal 2 serving as an upper apparatus via network cable 4 such as Ethernet (registration trademark) or cable 4 such as Centronics, USB, RS232C and the like.

The image forming apparatus 1 of the embodiment 1 is an image forming apparatus that interprets the same printer language as the standard image forming apparatus 3, but is assigned paper feeding tray that is different from the standard image forming apparatus 3. The image forming apparatus 1, as shown by FIG. 2, comprises a controlling section 11, an engine control section 12, a paper feeding section 13, a paper ejecting section 14, a paper movement section 15, an operator panel section 16, and a print control section 17. The image forming apparatus 1, as stated above, interprets the same printer language as the standard image forming apparatus 3. However, in the image forming apparatus 1, tray selection ID (hereinafter: execution apparatus tray selection ID) which is used to identify tray and is assigned to each tray furnished in the paper feeding section 13 is different from tray selection ID (hereinafter: standard apparatus tray selection ID) which is used to identify tray and is assigned to each tray furnished in the paper feeding section of the standard image forming apparatus 3; further, stacker selection ID (hereinafter: execution apparatus stacker selection ID) which is used to identify stacker and is assigned to each stacker furnished in the paper ejecting section 14 is different from stacker selection ID (hereinafter: standard apparatus stacker selection ID) which is used to identify stacker and is assigned to each stacker furnished in the paper ejecting section of the standard image forming apparatus 3.

Figure 3:
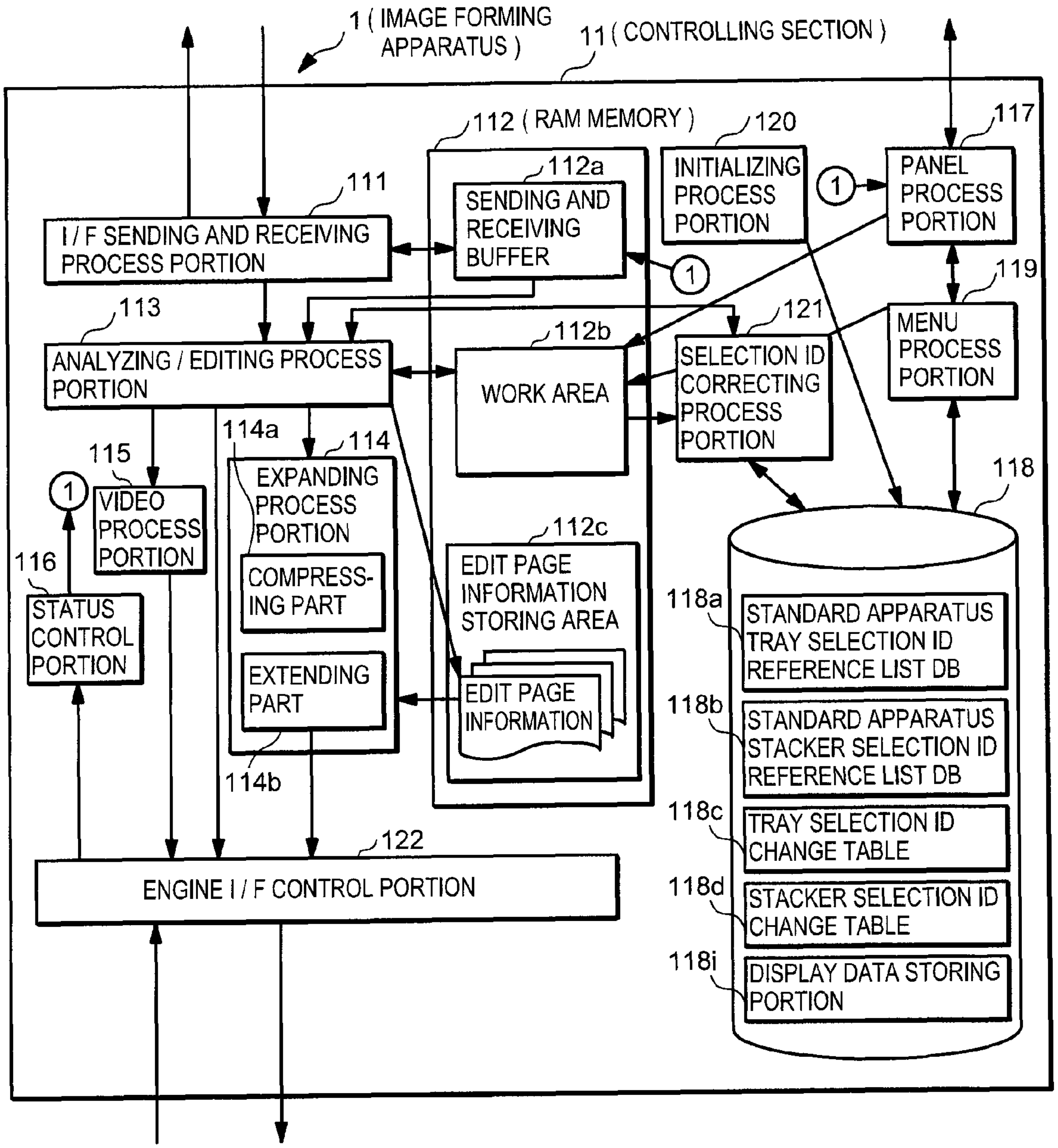
FIG. 3 is a block diagram showing a structure of controlling section in FIG. 1.

FIG. 3 is a block diagram showing a structure of controlling section in FIG. 1.

The controlling section 11, as shown by FIG. 3, includes an I/F sending and receiving process portion 111, a RAM memory 112, an analyzing/editing process portion 113, an expanding process portion 114, a VIDEO process portion 115, a status control portion 116, a panel process portion 117, a non-volatility memory 118, a menu process portion 119, an initializing process portion 120, a selection ID correcting process portion 121, and an engine I/F control portion 122.

The I/F sending and receiving process portion 111 receives print JOB data from the user terminal 2, stores the print JOB data into a sending and receiving buffer 112*a* of the RAM memory 112, and outputs a notification indicating that the print JOB data has been received to the analyzing/editing process portion 113. Further, the I/F sending and receiving process portion 111 sends transmission data such as error message, status information and the like stored in the sending and receiving buffer 112*a* of the RAM memory 112 to the user terminal 2 via the cable 4.

Figure 4:
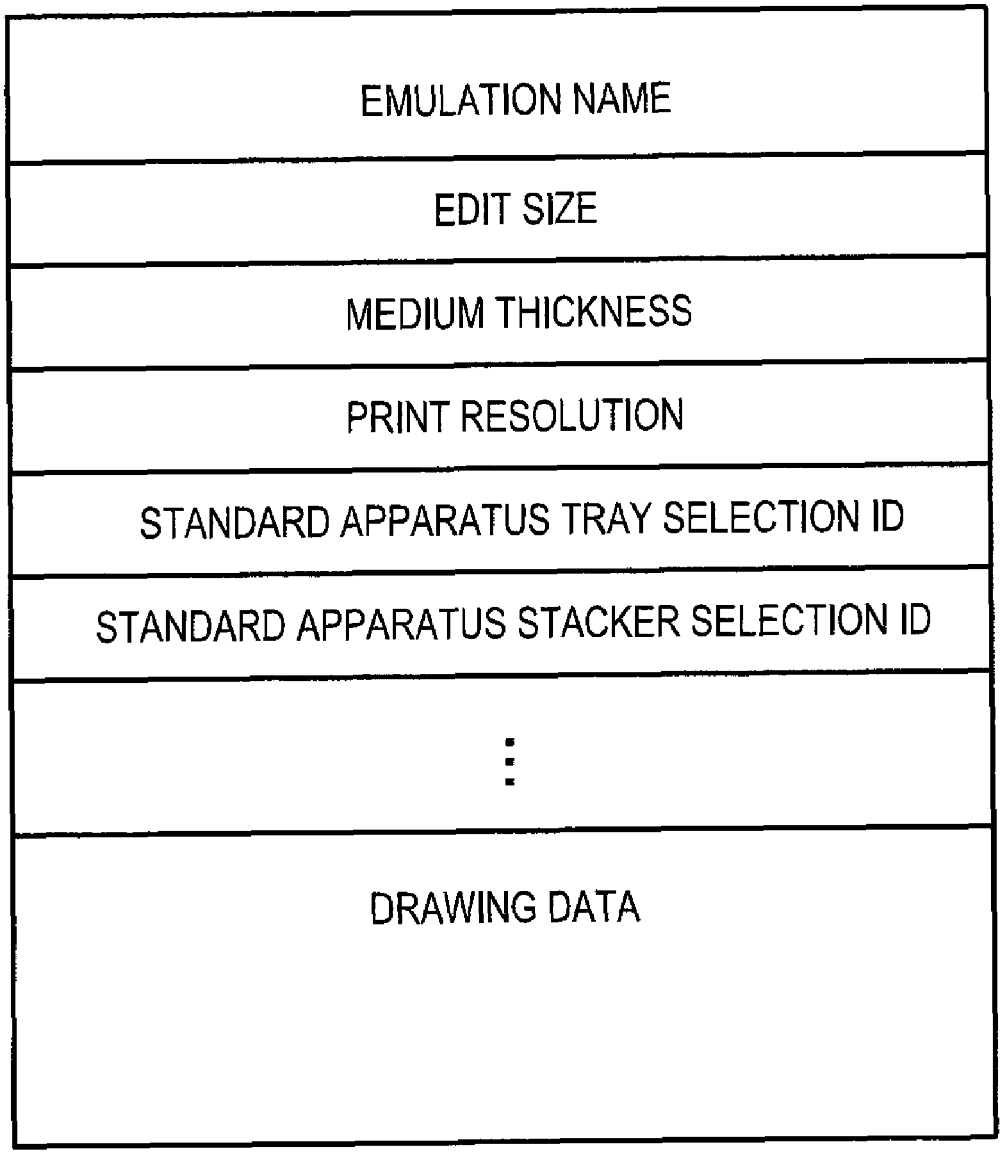
FIG. 4 is a diagram to explain print JOB data in embodiment 1 of the present invention.

FIG. 4 is a diagram to explain print JOB data in embodiment 1 of the present invention.

Moreover, as shown by FIG. 4, the print JOB data contains print designation information such as emulation name, edit size, medium thickness, print resolution, tray selection ID, stacker selection ID and the like, and drawing data. In the emulation name, a name of emulation used when the analyzing/editing process portion 113 analyzes/edits the print designation information is described; in the edit size, an edit size corresponding to size of paper to be printed is described; in the medium thickness, a thickness of print medium is described; in the print resolution, a resolution of an image transferred to paper is described; in the tray selection ID, that is, in the standard apparatus tray selection ID, an ID used for selecting tray to feed paper is described; and in the stacker selection ID, that is, in the standard apparatus stacker selection ID, an ID used for selecting stacker to eject paper is described.

The RAM memory 112 shown by FIG. 3 has a sending and receiving buffer 112*a* stated above, a work area 112*b* to store information necessary when performing print process, and an edit page information storing area 112*c* to store edit page information (described below).

The analyzing/editing process portion 113, after received the notification indicating that the print JOB data has been received from the I/F sending and receiving process portion 111, reads out the print JOB data stored in the sending and receiving buffer 112*a* of the RAM memory 112, outputs the emulation name, the standard apparatus tray selection ID and the standard apparatus stacker selection ID that are described in the print JOB data to the selection ID correcting process portion 121, and outputs a request to the selection ID correcting process portion 121 for correcting the standard apparatus tray selection ID and the standard apparatus stacker selection ID that are assigned to the standard image forming apparatus 3 into execution apparatus tray selection ID and execution apparatus stacker selection ID that are assigned to the image forming apparatus 1 in the embodiment 1.

Further, the analyzing/editing process portion 113, after received the execution apparatus tray selection ID obtained by correcting the standard apparatus tray selection ID and received the execution apparatus stacker selection ID obtained by correcting the standard apparatus stacker selection ID from the selection ID correcting process portion 121, outputs the execution apparatus tray selection ID and the execution apparatus stacker selection ID to the engine I/F control portion 122.

Further, the analyzing/editing process portion 113 outputs the medium thickness and the print resolution that are described in the print JOB data to the VIDEO process portion 115.

Furthermore, the analyzing/editing process portion 113 reads out the edit size described in the print JOB data; generates edit page information obtained by editing the drawing data described in the print JOB data according to page unit on the basis of the edit size; writes the edit page information into the edit page information storing area 112*c* of the RAM memory 112; and outputs an execution request of expanding process to the expanding process portion 114.

The expanding process portion 114, when received the execution request from the analyzing/editing process portion 113, reads out the edit page information stored in the edit page information storing area 112*c* of the RAM memory 112; makes print image data according to the edit page information, as raster data; and compresses/extends the print image data; then outputs the compressed/extended print image data to the engine I/F control portion 122. Here, a compressing part 114*a* compresses the print image data; and an extending part 114*b* extends the print image data.

The VIDEO process portion 115 generates print control parameter to designate image quality and the like when printing the drawing data onto paper on the basis of the medium thickness and the print resolution inputted from the analyzing/editing process portion 113; and outputs the print control parameter to the engine I/F control portion 122.

The status control portion 116 outputs status information composed of information representing alarm when abnormality happens in the image forming system of the embodiment 1 or representing state of apparatus to the sending and receiving buffer 112*a* of the RAM memory 112 and to the panel process portion 117, on the basis of sensor information outputted from various sensors (not shown) via the engine I/F control portion 122.

FIG. 5 is a diagram showing an example of tray/stacker selection ID input scene.

The panel process portion 117 reads out display data of a tray/stacker selection ID input scene shown by FIG. 5 from a display data storing portion 118*i* of the non-volatility memory 118 via the menu process portion 119; and makes a displaying portion 161 of the operator panel section 16 display the tray/stacker selection ID input scene.

As shown by FIG. 5, the tray/stacker selection ID input scene is a display scene in which information is inputted that is necessary when making a tray selection ID change table 118*c* (described below) and a stacker selection ID change table 118*d* (described below) of the non-volatility memory 118. On the tray/stacker selection ID input scene, an emulation name input column, a tray No. display column, an execution apparatus tray name display column, an execution apparatus tray selection ID input column, a stacker No display column, an execution apparatus stacker name display column, an execution apparatus stacker selection ID input column, and an OK button are displayed. In the emulation name input column, the emulation name used in the image forming apparatus 1 of the embodiment 1 is inputted; in the tray No. display column, tray No. is displayed; in the execution apparatus tray name display column, tray name corresponding to tray No. is displayed; in the execution apparatus tray selection ID input column, the execution apparatus tray selection ID assigned to tray in the image forming system of embodiment 1 is inputted; in the stacker No display column, stacker No is displayed; in the execution apparatus stacker name display column, stacker name corresponding to stacker No is displayed; and in the execution apparatus stacker selection ID input column, the execution apparatus stacker selection ID assigned to stacker in the image forming system of embodiment 1 is inputted.

Further, when the OK button in the tray/stacker selection ID input scene is clicked by user, the panel process portion 117 generates tray selection ID input data composed of the emulation name inputted in the emulation name input column, the tray No. in the scene and the execution apparatus tray selection ID inputted in the execution apparatus tray selection ID input column; and writes the generated tray selection ID input data into the work area 112*b* of the RAM memory 112. Furthermore, the panel process portion 117 generates stacker selection ID input data composed of the emulation name inputted in the emulation name input column, the stacker No in the scene and the execution apparatus stacker selection ID inputted in the execution apparatus stacker selection ID input column; and writes the generated stacker selection ID input data into the work area 112*b* of the RAM memory 112.

Further, the panel process portion 117, after wrote the tray selection ID input data and the stacker selection ID input data into the work area 112*b* of the RAM memory 112, outputs a making request of the tray selection ID change table 118*c* and the stacker selection ID change table 118*d* to the menu process portion 119.

The non-volatility memory 118, for example, is formed from EPROM, it has a standard apparatus tray selection ID reference list DB (database) 118*a*, a standard apparatus stacker selection ID reference list DB 118*b*, a tray selection ID change table 118*c*, a stacker selection ID change table 118*d*, and a display data storing portion 118*i*.

FIG. 6A is a diagram to explain standard apparatus tray selection ID reference list in FIG. 3.

The standard apparatus tray selection ID reference list DB 118*a* stores standard apparatus tray selection ID reference lists whose emulation names respectively are PCL, PS and SIDM. In these standard apparatus tray selection ID reference lists whose emulation names respectively are PCL, PS and SIDM, as shown by FIG. 6A, data respectively described, each data is composed of emulation name used by the standard image forming apparatus 3; tray No. assigned to the standard image forming apparatus 3; name of tray (hereinafter: standard apparatus tray name) furnished to correspond to the tray No.; and standard apparatus tray selection ID assigned to the tray of the standard apparatus tray name.

FIG. 6B is a diagram to explain standard apparatus stacker selection ID reference list in FIG. 3.

The standard apparatus stacker selection ID reference list DB 118*b* stores standard apparatus stacker selection ID reference lists whose emulation names respectively are PCL, PS and SIDM. In these standard apparatus stacker selection ID reference lists whose emulation names respectively are PCL, PS and SIDM, as shown by FIG. 6B, data respectively described, each data is composed of emulation name used by the standard image forming apparatus 3; stacker No assigned to the standard image forming apparatus 3; name of stacker (hereinafter: standard apparatus stacker name) furnished to correspond to the stacker No; and standard apparatus stacker selection ID assigned to the stacker of the standard apparatus stacker name.

FIG. 7A is a diagram showing an example of tray selection ID change table in FIG. 3.

The tray selection ID change table 118*c*, as shown by FIG. 7A, stores data composed of tray No. assigned to the standard image forming apparatus 3 and the image forming apparatus 1 of the embodiment 1; standard apparatus tray selection ID and the execution apparatus tray selection ID that respectively correspond to the tray No.

FIG. 7B is a diagram showing an example of stacker selection ID change table in FIG. 3.

The stacker selection ID change table 118*d*, as shown by FIG. 7B, stores data composed of stacker No. assigned to the standard image forming apparatus 3 and the image forming apparatus 1 of the embodiment 1; standard apparatus stacker selection ID and the execution apparatus stacker selection ID that respectively correspond to the stacker No.

The menu process portion 119, when received the making request of the tray selection ID change table 118*c* and the stacker selection ID change table 118*d* from the panel process portion 117, reads out tray selection ID input data from the work area 112*b* of the RAM memory 112. Then, the menu process portion 119 further read out the standard apparatus tray selection ID corresponding to the tray No. described in the tray selection ID input data that has been previously read out, from the standard apparatus tray selection ID reference list stored in the standard apparatus tray selection ID reference list DB 118*a*. Furthermore, the menu process portion 119 generates tray selection ID change table data composed of the tray No. described in the tray selection ID input data, the standard apparatus tray selection ID that is previously read out from the standard apparatus tray selection ID reference list, and the execution apparatus tray selection ID described in the tray selection ID input data; and registers the tray selection ID change table data into the tray selection ID change table 118*c* of the non-volatility memory 118.

Moreover, The menu process portion 119, when received the making request of the stacker selection ID change table 118*c* and the stacker selection ID change table 118*d* from the panel process portion 117, reads out stacker selection ID input data from the work area 112*b* of the RAM memory 112. Then, the menu process portion 119 further read out the standard apparatus stacker selection ID corresponding to the stacker No. described in the stacker selection ID input data that has been previously read out, from the standard apparatus stacker selection ID reference list stored in the standard apparatus stacker selection ID reference list DB 118*b*. Furthermore, the menu process portion 119 generates stacker selection ID change table data composed of the stacker No. described in the stacker selection ID input data, the standard apparatus stacker selection ID that is previously read out from the standard apparatus stacker selection ID reference list, and the execution apparatus stacker selection ID described in the stacker selection ID input data; and registers the stacker selection ID change table data into the stacker selection ID change table 118*d* of the non-volatility memory 118.

The initializing process portion 120 performs an initialization with respect to whole controlling section 11 when power source is turned on.

The selection ID correcting process portion 121, when received the standard apparatus tray selection ID and the standard apparatus stacker selection ID from the analyzing/editing process portion 113, reads out the execution apparatus tray selection ID corresponding to the standard apparatus tray selection ID from the tray selection ID change table 118*c* in the non-volatility memory 118, and reads out the execution apparatus stacker selection ID corresponding to the standard apparatus stacker selection ID from the stacker selection ID change table 118*d* in the non-volatility memory 118. Further, the selection ID correcting process portion 121 outputs the execution apparatus tray selection ID and the execution apparatus stacker selection ID that have been read out to the analyzing/editing process portion 113.

The engine I/F control portion 122 outputs the execution apparatus tray selection ID and the execution apparatus stacker selection ID received from the analyzing/editing process portion 113, the print image data received from the expanding process portion 114, and the print control parameter that is received from the VIDEO process portion 115 and is used to prescribe print image quality or the like, to the print control section 17; and outputs a beginning request for starting to the engine control section 12. Further, the engine I/F control portion 122 outputs status information representing alarm when abnormality happens in the image forming system of the embodiment 1 or representing state of apparatus to the status control portion 116 on the basis of sensor information outputted from various sensors (not shown) furnished in the engine control section 12.

The engine control section 12 shown by FIG. 2, when received the beginning request for starting from the engine I/F control portion 122, drives motor to suitably rotate photosensitive drum 15*a* stated below, transferring roller 15*c* stated below, fixing roller 15*e* stated below, pickup roller 15*f* stated below, registration roller 15*g* stated below, idle roller 15*h* stated below, drive roller 15*i* stated below, conveying roller 15*j* stated below, and ejecting roller 15*k* stated below.

Further, the engine control section 12 outputs information representing tray position when printing the print image data onto paper to the paper feeding section 13 and outputs information representing stacker position of paper ejection destination after print is ended to the paper ejecting section 14, on the basis of the execution apparatus tray selection ID and the execution apparatus stacker selection ID inputted from the engine I/F control portion 122.

In the paper feeding section 13, as shown by FIG. 2, from top to bottom, tray (Tray) 1, tray (Tray) 2, tray (Tray) 3, tray (Tray) 4, tray (Tray) 5 and tray (Tray) 6 are furnished. Then, the tray 1 is assigned a tray No. of "1", and has a tray name of "Multi Feeder". The tray 2 is assigned a tray No. of "2", and has a tray name of "Input Tray1". The tray 3 is assigned a tray No. of "3", and has a tray name of "Input Tray2". The tray 4 is assigned a tray No. of "4", and has a tray name of "Input Tray3". The tray 5 is assigned a tray No. of "5", and has a tray name of "Input Tray4". The tray 6 is assigned a tray No. of "6", and has a tray name of "Input Tray5".

In the paper ejecting section 14, from top to bottom, stacker (Stacker) 0, stacker (Stacker) 1, stacker (Stacker) 2, stacker (Stacker) 3 and stacker (Stacker) 4 are furnished. Then, the stacker 0 is assigned a stacker No. of "1", and has a stacker name of "Stacker0". The stacker 1 is assigned a stacker No. of "2", and has a stacker name of "Stacker1". The stacker 2 is assigned a stacker No. of "3", and has a stacker name of "Stacker2". The stacker 3 is assigned a stacker No. of "4, and has a stacker name of "Stacker3". The stacker 4 is assigned a stacker No. of "5", and has a stacker name of "Stacker4".

The paper movement section 15 is divided into black part, yellow part, magenta part and cyan part, it includes photosensitive drum 15*a* for carrying image; charging unit (not shown) for negatively charging the photosensitive drum 15*a*; exposing unit 15*b* having LED emitting light for forming electrostatic latent image onto the photosensitive drum 15*a*; developing unit (not shown) which uses developer of toner with minus charge to make the electrostatic latent image formed on the photosensitive drum 15*a* become visible; transferring unit (not shown) having the transferring roller 15*c* to transfer toner image onto paper; and fixing device 15*d* having the fixing roller 15*e* to fix the toner image transferred on paper.

Further, along a movement route on which paper is conveyed from the paper feeding section 13 to paper ejecting section 14, the paper movement section 15 includes pickup roller 15*f* to bring out paper from tray of the paper feeding section 13; registration roller 15*g* to supply paper to the photosensitive drum 15*a*; idle roller 15*h* and drive roller 15*i* for supplying a fix extending force to transfer belt; conveying roller 15*j* to convey paper; ejecting roller 15*k* to eject paper on which toner image is fixed to the paper ejecting section 14; cleaning roller 15l to clean toner adhering to the photosensitive drum 15*a*; and the like.

The operator panel section 16 has a displaying portion 161 and an operating portion 162. The displaying portion 161, for example, displays tray/stacker selection ID input scene stated above. The operating portion 162, for example, has various operation keys for inputting input information to input column displayed in the tray/stacker selection ID input scene.

The print control section 17, when received print image data, medium thickness and print control parameter inputted from the engine I/F control portion 122, after outputted an instruction to the charging unit to supply minus charge to the photosensitive drum 15*a*, outputs an instruction to the exposing unit 15*b* to emit light for forming electrostatic latent image onto the photosensitive drum 15*a*. Further, the print control section 17, after outputted an instruction to the developing unit to use developer of toner with minus charge to make the electrostatic latent image formed on the photosensitive drum 15*a* become visible, outputs an instruction to the transferring unit to transfer toner image onto paper. Furthermore, the print control section 17 outputs a request to the fixing device 15*d* to fix the toner image transferred on the paper.

Next, it is to explain operation of the image forming apparatus in the embodiment 1 of the present invention. The operation is divided into (1) operation till tray selection ID change table and tray selection ID change table are made; and (2) operation to actually execute print process after made these tables.

Figure 8:
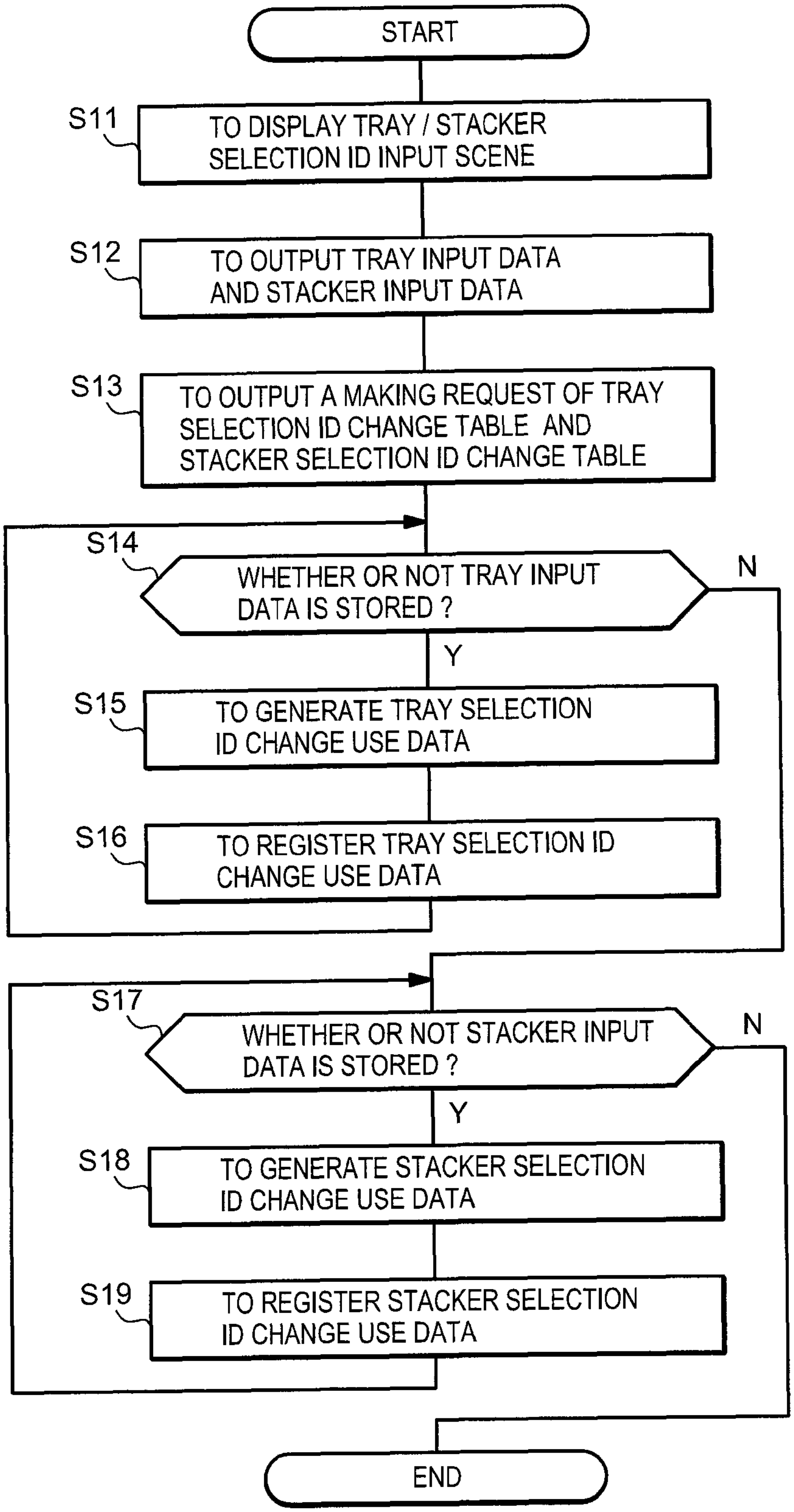
FIG. 8 is a first flowchart for explaining operation of an image forming apparatus in embodiment 1 of the present invention.

Regarding (1) operation till tray selection ID change table and tray selection ID change table are made:

FIG. 8 is a first flowchart for explaining operation of an image forming apparatus in embodiment 1 of the present invention.

The flowchart representing operation till the tray selection ID change table 118*c* and the stacker selection ID change table 118*d* are made. First, user uses operation keys furnished in the operating portion 162 in the operator panel section 16 to display a tray/stacker selection ID input scene shown by FIG. 5 onto the displaying portion 161 (Step S11).

Then, after the user used the various keys to perform input shown by FIG. 5 and click OK button, the displaying portion

161 outputs tray selection ID input data and stacker selection ID input data that are represented below to the panel process portion 117 (Step S12).

In the tray selection ID input data outputted to the panel process portion 117, as shown by FIG. 5, 1) tray selection ID input data composed of emulation name of "PCL", tray No. of "1" and execution apparatus tray selection ID of "2"; 2) tray selection ID input data composed of emulation name of "PCL", tray No. of "2" and execution apparatus tray selection ID of "1"; 3) tray selection ID input data composed of emulation name of "PCL", tray No. of "3" and execution apparatus tray selection ID of "5"; 4) tray selection ID input data composed of emulation name of "PCL", tray No. of "4" and execution apparatus tray selection ID of "8"; 5) tray selection ID input data composed of emulation name of "PCL", tray No. of "5" and execution apparatus tray selection ID of "3"; and 6) tray selection ID input data composed of emulation name of "PCL", tray No. of "6" and execution apparatus tray selection ID of "9", are described.

In the stacker selection ID input data outputted to the panel process portion 117, as shown by FIG. 5, 1) stacker selection ID input data composed of emulation name of "PCL", stacker No. of "1" and execution apparatus stacker selection ID of "3"; 2) stacker selection ID input data composed of emulation name of "PCL", stacker No. of "2" and execution apparatus stacker selection ID of "5"; 3) stacker selection ID input data composed of emulation name of "PCL", stacker No. of "3" and execution apparatus stacker selection ID of "2"; 4) stacker selection ID input data composed of emulation name of "PCL", stacker No. of "4" and execution apparatus stacker selection ID of "1"; and 5) stacker selection ID input data composed of emulation name of "PCL", stacker No. of "5" and execution apparatus stacker selection ID of "4", are described.

The panel process portion 117 after received the tray selection ID input data and the stacker selection ID input data, writes the tray selection ID input data and the stacker selection ID input data into the work area 112*b* of the RAM memory 112, and outputs a making request of the tray selection ID change table 118*c* and the stacker selection ID change table 118*d* to the menu process portion 119 (Step S13).

The menu process portion 119, after received the making request from the panel process portion 117, judges whether or not tray selection ID input data that is not read out yet is stored in the work area 112*b* of the RAM memory 112 (Step S14).

The menu process portion 119, in the case to judge that tray selection ID input data that is not read out yet is stored in the work area 112*b* of the RAM memory 112 (Step S14, YES), reads out the tray selection ID input data that is not read out yet from the work area 112*b* of the RAM memory 112.

Later, in the standard apparatus tray selection ID reference lists stored in the standard apparatus tray selection ID reference list DB 118*a*, from the standard apparatus tray selection ID reference list of the emulation name described in the tray selection ID input data that has been previously read out, the menu process portion 119 reads out standard apparatus tray selection ID corresponding to the tray No. described in the tray selection ID input data. Next, the menu process portion 119 generates tray selection ID change table data composed of the tray No. described in the tray selection ID input data, the standard apparatus tray selection ID that is previously read out from the standard apparatus tray selection ID reference list, and the execution apparatus tray selection ID described in the tray selection ID input data (Step S15); and registers the tray selection ID change table data into the tray selection ID change table 118*c* of the non-volatility memory 118 (Step S16). Then, the menu process portion 119 moves to process step S14 and continues the same process stated above.

In the step S14, the menu process portion 119, in the case to judge that tray selection ID input data that is not read out yet is not stored in the work area 112*b* of the RAM memory 112 (Step S14, NO), identifies that the tray selection ID change table 118*c* shown by FIG. 6A is generated.

After that, the menu process portion 119 judges whether or not stacker selection ID input data is stored in the work area 112*b* of the RAM memory 112 (Step S17). The menu process portion 119, when judged that stacker selection ID input data is stored in the work area 112*b* of the RAM memory 112 (Step S17, YES), in the standard apparatus stacker selection ID reference lists stored in the standard apparatus stacker selection ID reference list DB 118*a*, from the standard apparatus stacker selection ID reference list of the emulation name described in the stacker selection ID input data that has been previously read out, reads out standard apparatus stacker selection ID corresponding to the stacker No. described in the stacker selection ID input data. Next, the menu process portion 119 generates stacker selection ID change table data composed of the stacker No. described in the stacker selection ID input data, the standard apparatus stacker selection ID that is previously read out from the standard apparatus stacker selection ID reference list, and the execution apparatus stacker selection ID described in the stacker selection ID input data (Step S18); and registers the stacker selection ID change table data into the stacker selection ID change table 118*d* of the non-volatility memory 118 (Step S19). Then, the menu process portion 119 moves to process step S17 and continues the same process stated above.

In the step S17, the menu process portion 119, in the case to judge that stacker selection ID input data is not stored in the work area 112*b* of the RAM memory 112 (Step S17, NO), identifies that the stacker selection ID change table 118*d* shown by FIG. 6B is generated, and ends the process.

Figure 9:
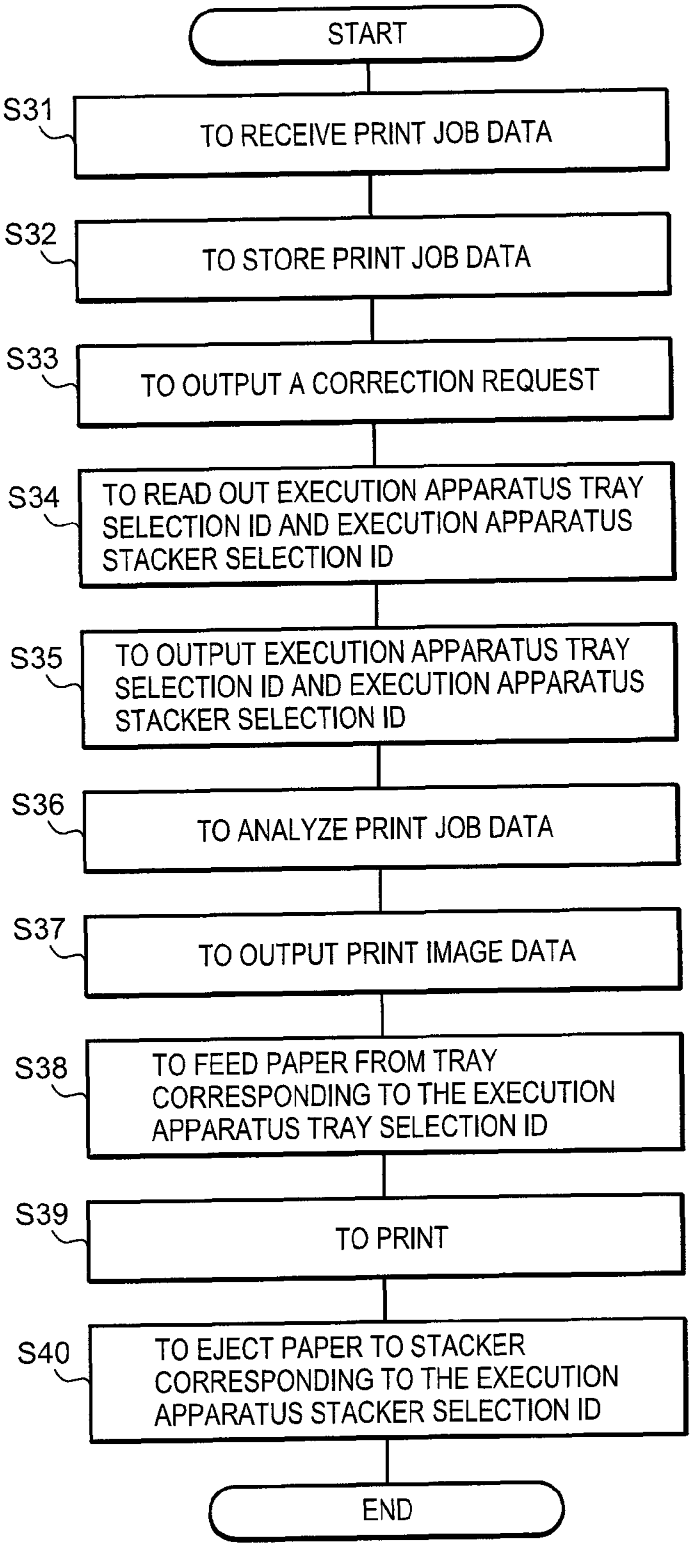
FIG. 9 is a second flowchart for explaining operation of an image forming apparatus in embodiment 1 of the present invention.

Next, regarding (2) operation to actually execute print process after these tables are made:

FIG. 9 is a second flowchart for explaining operation of an image forming apparatus in embodiment 1 of the present invention. The flowchart represents operation till print process is actually executed after the tray selection ID change table 118*c* and the stacker selection ID change table 118*d* are made.

When print JOB data is sent to the image forming system of embodiment 1 from the user terminal 2 operated by user (Step S31) via the cable 4, the I/F sending and receiving process portion 111 makes the sending and receiving buffer 112*a* in the RAM memory 112 store the received print JOB data (Step S32), and outputs a notification representing that the print JOB data is received to the analyzing/editing process portion 113.

Next, the analyzing/editing process portion 113 reads out the standard apparatus tray selection ID and the standard apparatus stacker selection ID from the print JOB data stored in the sending and receiving buffer 112*a*, and outputs the standard apparatus tray selection ID and the standard apparatus stacker selection ID to the selection ID correcting process portion 121 (Step S33).

Later, the selection ID correcting process portion 121, after received the standard apparatus tray selection ID and the standard apparatus stacker selection ID, reads out the execution apparatus tray selection ID corresponding to the standard apparatus tray selection ID from the tray selection ID change table 118*c* (refer to FIG. 7A), and reads out the execution apparatus stacker selection ID corresponding to the standard apparatus stacker selection ID from the stacker selection ID change table 118*d* (refer to FIG. 7B) (Step S34). Next, the selection ID correcting process portion 121 outputs the execution apparatus tray selection ID and the execution apparatus stacker selection ID that have been read out to the analyzing/editing process portion 113.

The analyzing/editing process portion 113, after received the execution apparatus tray selection ID and the execution apparatus stacker selection ID, outputs the execution apparatus tray selection ID and the execution apparatus stacker selection ID to the engine I/F control portion 122 (Step S35). Next, the analyzing/editing process portion 113 reads out the print JOB data stored in the sending and receiving buffer 112*a* of the RAM memory 112, analyzes the print JOB data (Step S36), and outputs medium thickness and print resolution described in the print JOB data to the VIDEO process portion 115.

After that, the analyzing/editing process portion 113 reads out edit size described in the print JOB data, generates edit page information obtained by editing drawing data described in the print JOB data on the basis of the edit size, writes the edit page information into the edit page information storing area 112*c* of the RAM memory 112, and outputs an execution request of expanding process to the expanding process portion 114.

The VIDEO process portion 115 generates print control parameter to designate image quality and the like on the basis of the medium thickness and the print resolution inputted from the analyzing/editing process portion 113; and outputs the print control parameter to the engine I/F control portion 122.

The expanding process portion 114, when received the execution request from the analyzing/editing process portion 113, reads out the edit page information stored in the edit page information storing area 112*c* of the RAM memory 112; makes print image data according to the edit page information, as raster data; and compresses/extends the print image data; then outputs the compressed/extended print image data to the engine I/F control portion 122 (Step S37).

The engine I/F control portion 122 outputs the print image data inputted from the expanding process portion 114 and the print control parameter that is inputted from the VIDEO process portion 115 and is used to prescribe print quality and the like to the print control section 17, and outputs the execution apparatus tray selection ID and the execution apparatus stacker selection ID that are inputted from the analyzing/editing process portion 113 to the engine control section 12.

The engine control section 12, after received the execution apparatus tray selection ID and the execution apparatus stacker selection ID from the engine I/F control portion 122, drives motor to suitably rotate the photosensitive drum 15*a*, the transferring roller 15*c*, the fixing roller 15*e*, the pickup roller 15*f*, the registration roller 15*g*, the idle roller 15*h*, the drive roller 15*i*, the conveying roller 15*j*, and the ejecting roller 15*k*.

Thus, the pickup roller 15*f* designated by the engine control section 12 takes out paper from tray designated by the execution apparatus tray selection ID, and the registration roller 15*g* conveys the paper that has been taken out to the photosensitive drum 15*a* (Step S38).

The print control section 17, when received print image data, medium thickness and print control parameter inputted from the engine I/F control portion 122, controls the charging unit to supply minus charge to the photosensitive drum 15*a*, controls the exposing unit 15*b* to emit light to form an electrostatic latent image onto the photosensitive drum 15*a*, controls the developing unit to use developer of toner with minus charge to make the electrostatic latent image formed on the photosensitive drum 15*a* become visible, then, controls the transferring unit to transfer toner image onto paper. Furthermore, the print control section 17 controls the fixing device 15*d* to fix the toner image transferred on the paper (Step S39).

Later, the paper movement section 15 conveys the paper on which the print image data is printed to the paper ejecting section 14.

The paper ejecting section 14 ejects the printed paper to the stacker corresponding to the execution apparatus stacker selection ID (Step S40). Then, the process is ended.

According to the embodiment 1, the selection ID correcting process portion 121 corrects the standard apparatus tray selection ID described in the print JOB data received from the user terminal 2 into the execution apparatus tray selection ID corresponding to the standard apparatus tray selection ID described in the tray selection ID change table 118*c*, therefore, in the case to add and furnish an image forming apparatus whose paper feeding position designation information described in the print JOB data is different from other image forming apparatus, it is possible to feed paper from tray of paper feeding position desired by user.

Further, according to the embodiment 1, the selection ID correcting process portion 121 corrects the standard apparatus stacker selection ID described in the print JOB data received from the user terminal 2 into the execution apparatus stacker selection ID corresponding to the standard apparatus stacker selection ID described in the stacker selection ID change table 118*c*, therefore, in the case to add and furnish an image forming apparatus whose paper ejecting position designation information described in the print JOB data is different from other image forming apparatus, it is possible to eject paper to stacker of paper ejecting position desired by user.

Moreover, according to the embodiment 1, the menu process portion 119 uses the standard apparatus tray selection ID described in the standard apparatus tray selection ID reference list DB 118*a* of the non-volatility memory 118 and uses the tray selection ID of self apparatus, which is inputted from the tray/stacker selection ID input scene displayed on the displaying portion 161, to generate the tray selection ID change table 118*c*, therefore, it is possible to generate simply the tray selection ID change table 118*c* with respect to user.

Furthermore, according to the embodiment 1, the menu process portion 119 uses the standard apparatus stacker selection ID described in the standard apparatus stacker selection ID reference list DB 118*b* of the non-volatility memory 118 and uses the stacker selection ID of self apparatus, which is inputted from the stacker/stacker selection ID input scene displayed on the displaying portion 161, to generate the stacker selection ID change table 118*c*, therefore, it is possible to generate simply the stacker selection ID change table 118*d* with respect to user.

Embodiment 2

Figure 10:
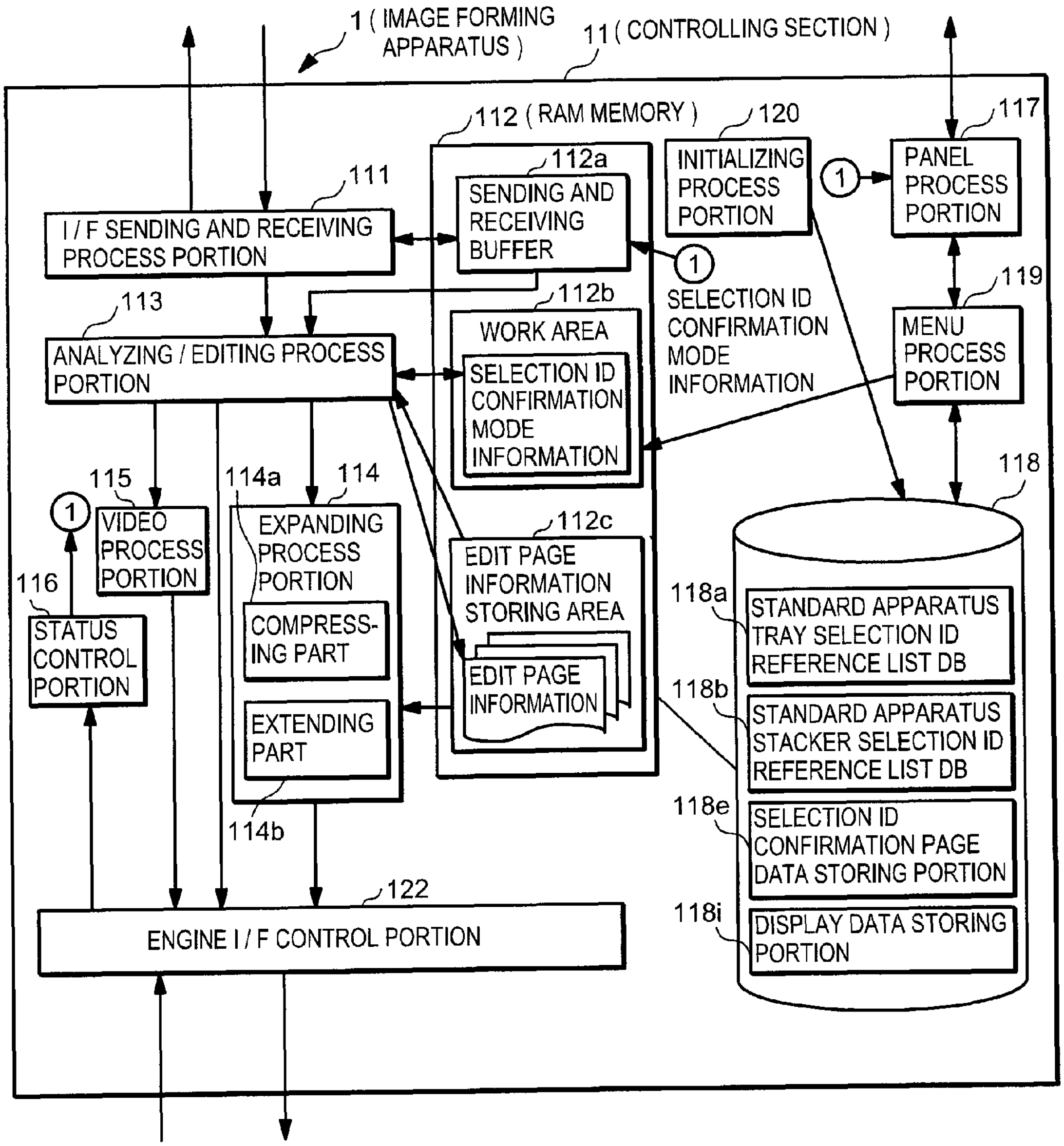
FIG. 10 is a block diagram showing a structure of controlling section in an image forming apparatus of embodiment 2 of the present invention.

FIG. 10 is a block diagram showing a structure of controlling section in an image forming apparatus of embodiment 2 of the present invention.

As shown by FIG. 10, an image forming apparatus 1 of the embodiment 2, similar to the image forming apparatus 1 of the embodiment 1, together with plural standard image forming apparatuses 3 that interpret the same printer language (PDL (PCL, PS and the like), SIDM), is connected with a user terminal 2 serving as an upper apparatus via network cable 4 such as Ethernet (registration trademark) or cable 4 such as Centronics, USB, RS232C and the like.

The image forming apparatus 1, as shown by FIG. 2, comprises a controlling section 11, an engine control section 12, a paper feeding section 13, a paper ejecting section 14, a paper movement section 15, an operator panel section 16, and a print control section 17. Here, the engine control section 12, the paper feeding section 13, the paper ejecting section 14, the paper movement section 15, the operator panel section 16, and the print control section 17 have the same structure and function as that in embodiment 1.

As shown by FIG. 10, the controlling section 11 includes an I/F sending and receiving process portion 111, a RAM memory 112, an analyzing/editing process portion 113, an expanding process portion 114, a VIDEO process portion 115, a status control portion 116, a panel process portion 117, a non-volatility memory 118, a menu process portion 119, an initializing process portion 120, a selection ID correcting process portion 121, and an engine I/F control portion 122. Here, the I/F sending and receiving process portion 111, the expanding process portion 114, the VIDEO process portion 115, the status control portion 116, the initializing process portion 120, and the engine I/F control portion 122 have the same structure and function as that in embodiment 1, so their explanations are omitted.

The RAM memory 112, like that in embodiment 1, has a sending and receiving buffer 112*a*, a work area 112*b*, and an edit page information storing area 112*c*. The RAM memory 112 stores selection ID confirmation mode information to the work area 112*b*. the selection ID confirmation mode information represents a mode in which selection ID confirmation page (described below) is in printing state.

FIG. 11 is a diagram to explain content of selection ID confirmation page.

The analyzing/editing process portion 113 executes process that is performed by the analyzing/editing process portion 113 in embodiment 1. Further, the analyzing/editing process portion 113, when the selection ID confirmation mode information is stored into the work area 112*b* of the RAM memory 112, reads out selection ID confirmation page data that is stored in a selection ID confirmation page data storing portion 118*e* (described below) of the non-volatility memory 118 and is used for printing selection ID confirmation page shown by FIG. 11. Then, the analyzing/editing process portion 113 makes the read out selection ID confirmation page data be stored into a place in front of edit page information stored in the edit page information storing area 112*c* of the RAM memory 112, as a part of edit page information.

Here, the selection ID confirmation page is used when user respectively inputs the execution apparatus tray selection ID and the execution apparatus stacker selection ID into the execution apparatus tray selection ID input display column and the execution apparatus stacker selection ID input display column displayed in the tray/stacker selection ID input scene shown by FIG. 5, in order to form the tray selection ID change table 118*c* and the stacker selection ID change table 118*d* in the image forming apparatus 1 of embodiment 1.

The selection ID confirmation page, as shown by FIG. 11, has a display column to display "print JOB data analysis result" and a display column to display "attribute of paper feeding unit/paper ejecting unit furnished in the image forming apparatus". In the display column to display "print JOB data analysis result", (1) PDL emulation kind display column; (2) PDL standard apparatus tray selection ID display column and (3) PDL standard apparatus stacker selection ID display column are furnished. In the display column to display "attribute of paper feeding unit/paper ejecting unit furnished in the image forming apparatus", a display column to display tray name in paper feeding unit, and a display column to display tray selection IDs of emulations of each tray name are furnished; further, a display column to display stacker name in paper ejecting unit, and a display column to display stacker selection IDs of emulations of each stacker name are furnished.

Figure 12:
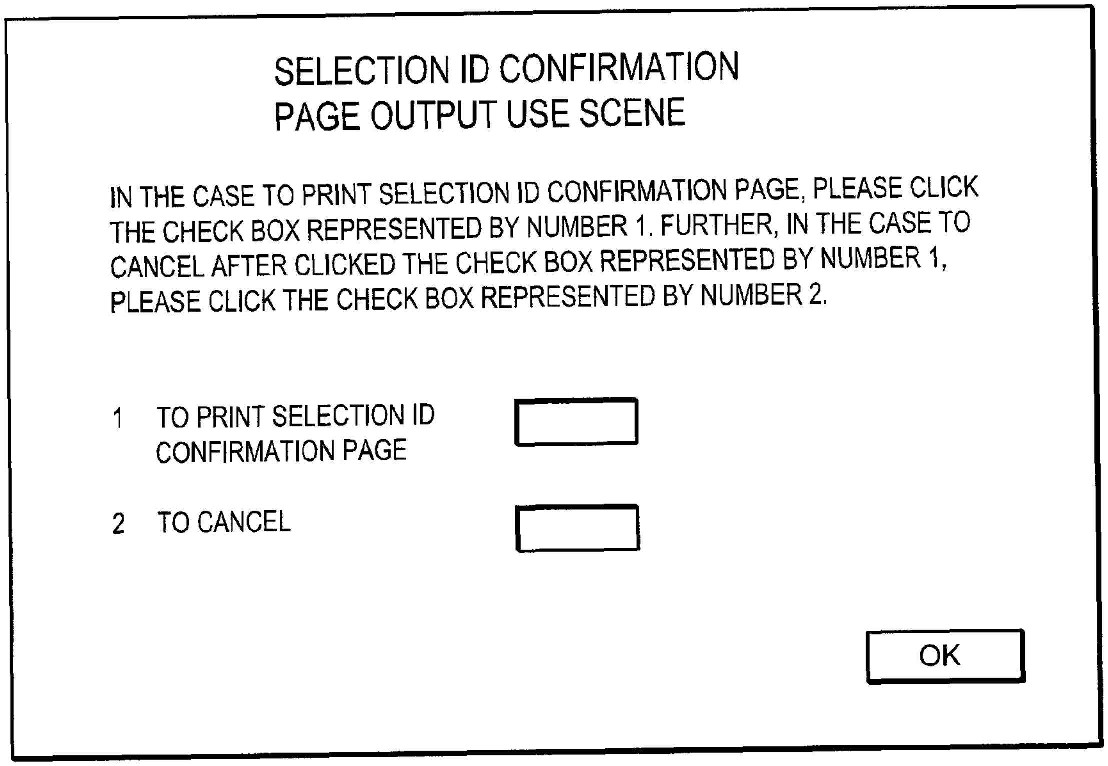
FIG. 12 is a diagram showing an example of selection ID confirmation page output scene.

FIG. 12 is a diagram showing an example of selection ID confirmation page output scene.

The panel process portion 117 reads out display data used for displaying a selection ID confirmation page output use scene shown by FIG. 12 from a display data storing portion 118*i* of the non-volatility memory 118 via the menu process portion 119, outputs the display data to the displaying portion 161 of the operator panel section 16, and makes the displaying portion 161 display the selection ID confirmation page output use scene.

As shown by FIG. 12, in the selection ID confirmation output use scene, a check box which is clicked when printing the selection ID confirmation page; a check box which is clicked when cancelling; and an OK button are displayed.

Further, when the check box in the place of "to print Selection ID confirmation page" in the selection ID confirmation output use scene is clicked and the OK button is clicked, the panel process portion 117 outputs a notification representing such operations to the menu process portion 119. When the check box in the place of "to cancel" in the selection ID confirmation output use scene is clicked and the OK button is clicked, the panel process portion 117 also outputs a notification representing such operations to the menu process portion 119.

The non-volatility memory 118 shown by FIG. 10 includes a standard apparatus tray selection ID reference list DB 118*a*, a standard apparatus stacker selection ID reference list DB 118*b*, a selection ID confirmation page data storing portion 118*e*, and a display data storing portion 118*i*. Here, the standard apparatus tray selection ID reference list DB 118*a* and the standard apparatus stacker selection ID reference list DB 118*b* are the same as that in embodiment 1.

The selection ID confirmation page data storing portion 118*e* stores selection ID confirmation page data for generating selection ID confirmation page which is firstly printed and is shown by FIG. 11, when executing a print about the print JOB data inputted from the user terminal 2.

The display data storing portion 118*i* stores display data for displaying the selection ID confirmation output use scene shown by FIG. 12.

The menu process portion 119, when received the notification representing that the check box in the place of "to print Selection ID confirmation page" in the selection ID confirmation output use scene is clicked from the panel process portion 117, writes the selection ID confirmation mode information to the work area 112*b* of the RAM memory 112.

Next, it is to explain operation of the image forming apparatus in the embodiment 2 of the present invention.

Figure 13:
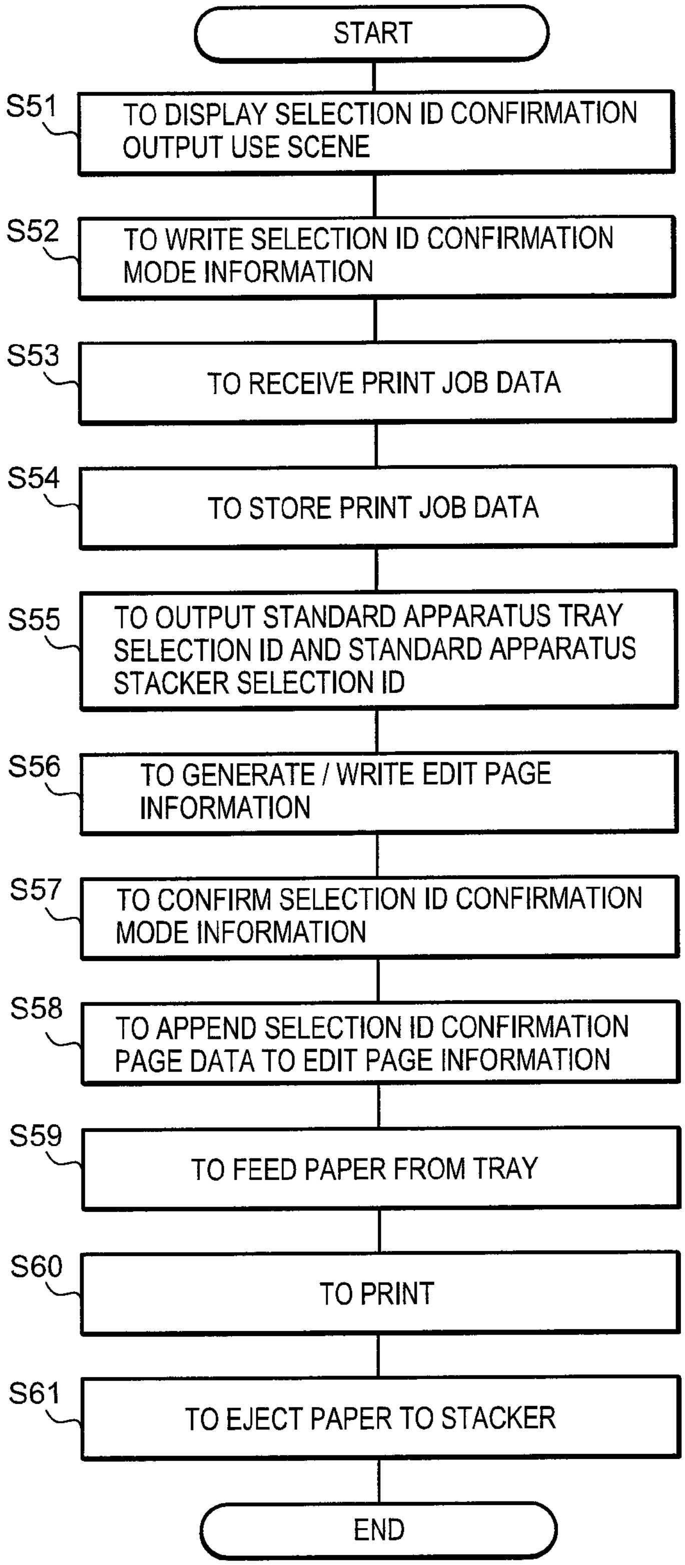
FIG. 13 is a flowchart for explaining operation of an image forming apparatus in embodiment 2 of the present invention.

FIG. 13 is a flowchart for explaining operation of an image forming apparatus in embodiment 2 of the present invention.

User uses the operating portion 162 of the operator panel section 16 to display the selection ID confirmation output use scene shown by FIG. 12 on the displaying portion 161 (Step S51). Next, after user placed cursor on the check box in the place of "to print Selection ID confirmation page" in the selection ID confirmation output use scene to click mouse, and placed cursor on the OK button to click mouse, the operator panel section 16 outputs a notification representing that the check box in the place of "to print Selection ID confirmation page" in the selection ID confirmation output use scene is clicked to the menu process portion 119 via the panel process portion 117.

The menu process portion 119, when received the notification representing that the check box in the place of "to print Selection ID confirmation page" is clicked from the operator panel section 16 via the panel process portion 117, writes selection ID confirmation mode information to the work area 112*b* of the RAM memory 112 (Step S52).

Later, the I/F sending and receiving process portion 111, when received print JOB data from the user terminal 2 via the cable 4 (Step S53), makes the sending and receiving buffer 112*a* in the RAM memory 112 store the received print JOB data (Step S54), and outputs a notification representing that the print JOB data is received to the analyzing/editing process portion 113.

Next, the analyzing/editing process portion 113 reads out the standard apparatus tray selection ID and the standard apparatus stacker selection ID from the print JOB data stored in the sending and receiving buffer 112*a*, and outputs the standard apparatus tray selection ID and the standard apparatus stacker selection ID to the engine I/F control portion 122 (Step S55).

Later, the analyzing/editing process portion 113 reads out the print JOB data stored in the sending and receiving buffer 112*a* of the RAM memory 112, analyzes the print JOB data, and outputs medium thickness and print resolution described in the print JOB data to the VIDEO process portion 115.

Next, the analyzing/editing process portion 113 reads out edit size described in the print JOB data, generates edit page information obtained by editing drawing data described in the print JOB data on the basis of the edit size (Step S56), and writes the edit page information into the edit page information storing area 112*c* of the RAM memory 112.

After that, the analyzing/editing process portion 113, when confirmed that selection ID confirmation mode information is stored in the work area 112*b* of the RAM memory 112 (Step S57), reads out the selection ID confirmation page data stored in the selection ID confirmation page data storing portion 118*e* of the non-volatility memory 118. Next, the analyzing/editing process portion 113 appends the read out selection ID confirmation page data to a place in front of edit page information stored in the edit page information storing area 112*c* of the RAM memory 112, as a part of edit page information (Step S58); and outputs an execution request of expanding process to the expanding process portion 114.

The VIDEO process portion 115 generates print control parameter to designate image quality and the like on the basis of the medium thickness and the print resolution; and outputs the print control parameter to the engine I/F control portion 122.

The expanding process portion 114, when received the execution request from the analyzing/editing process portion 113, reads out the edit page information stored in the edit page information storing area 112*c* of the RAM memory 112; makes print image data according to the edit page information, as raster data; and compresses/extends the print image data; then outputs the compressed/extended print image data to the engine I/F control portion 122.

The engine I/F control portion 122 outputs the print image data inputted from the expanding process portion 114 and the print control parameter that is inputted from the VIDEO process portion 115 and is used to prescribe print quality and the like to the print control section 17, and outputs the execution apparatus tray selection ID and the execution apparatus stacker selection ID that are inputted from the analyzing/editing process portion 113 to the engine control section 12.

The engine control section 12, after received the execution apparatus tray selection ID and the execution apparatus stacker selection ID from the engine I/F control portion 122, drives motor to suitably rotate the photosensitive drum 15*a*, the transferring roller 15*c*, the fixing roller 15*e*, the pickup roller 15*f*, the registration roller 15*g*, the idle roller 15*h*, the drive roller 15*i*, the conveying roller 15*j*, and the ejecting roller 15*k*.

Thus, the pickup roller 15*f* designated by the engine control section 12 takes out paper from tray designated by the execution apparatus tray selection ID, and the registration roller 15*g* conveys the paper that has been taken out to the photosensitive drum 15*a* (Step S59).

After that, the print control section 17, on the basis of the print image data, medium thickness and print control parameter inputted from the engine I/F control portion 122, controls the charging unit to supply minus charge to the photosensitive drum 15*a*, controls the exposing unit 15*b* to emit light to form an electrostatic latent image onto the photosensitive drum 15*a*, controls the developing unit to use developer of toner with minus charge to make the electrostatic latent image formed on the photosensitive drum 15*a* become visible, then, controls the transferring unit to transfer toner image onto paper. Furthermore, the print control section 17 controls the fixing device 15*d* to fix the toner image transferred on the paper (Step S60).

Later, the paper movement section 15 conveys the paper on which the print image data is printed to the paper ejecting section 14.

The paper ejecting section 14 ejects the printed paper to the stacker corresponding to the execution apparatus stacker selection ID (Step S61). Then, the process is ended.

According to the embodiment 2, through the print control section 17, after the print JOB data is received from the user terminal 2, the selection ID confirmation page data that is stored in the selection ID confirmation page data storing portion 118*e* of the non-volatility memory 118 and is used for making user confirm the tray selection ID and the stacker selection ID of self apparatus, is printed together with image data of the print JOB data. Therefore, it is possible to make user have reference in the case to input the tray selection ID of self apparatus to the tray selection ID input scene and in the case to input the stacker selection ID of self apparatus to the stacker selection ID input scene.

Embodiment 3

Figure 14:
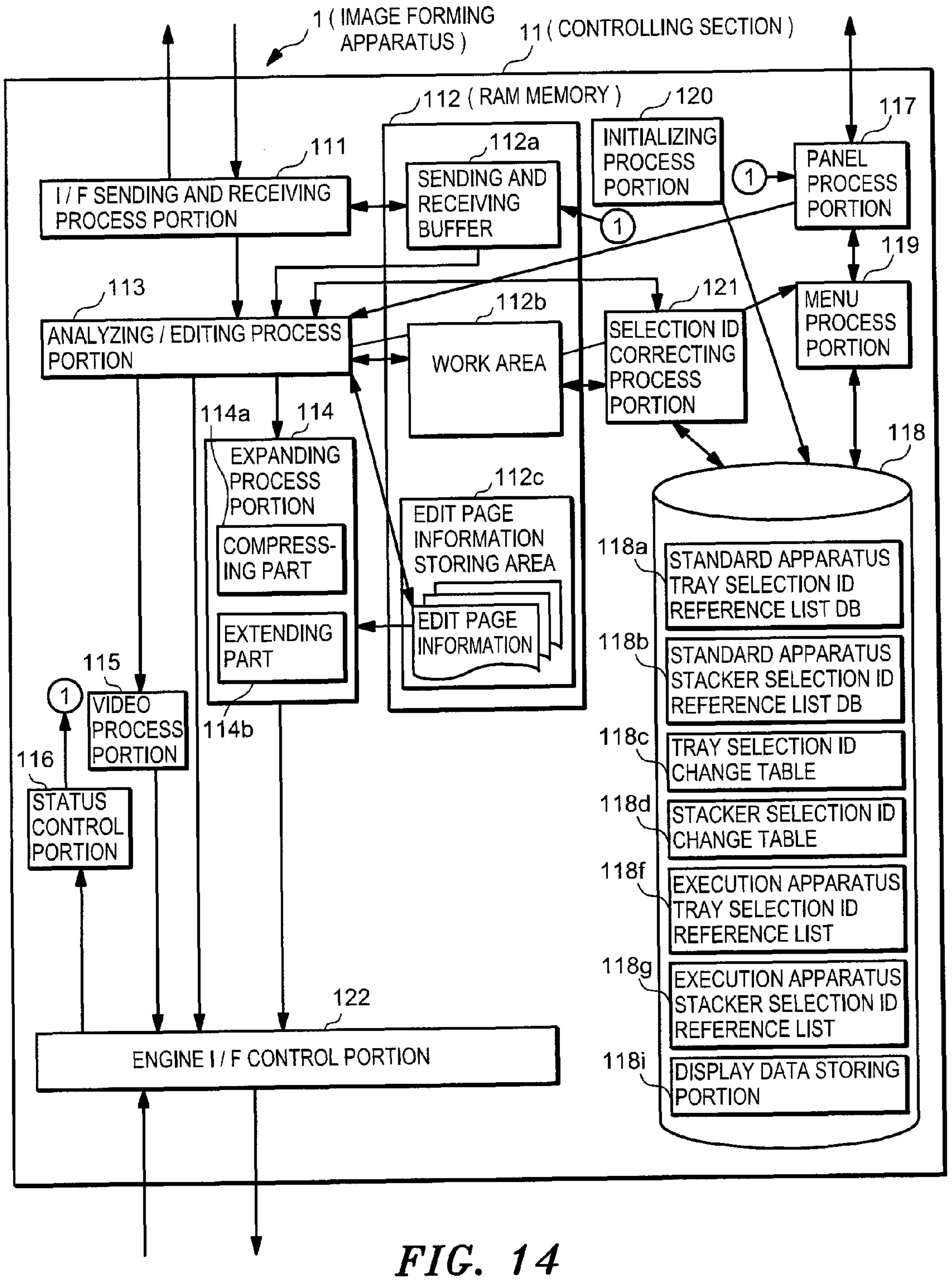
FIG. 14 is a block diagram showing a structure of controlling section in an image forming apparatus of embodiment 3 of the present invention.

FIG. 14 is a block diagram showing a structure of controlling section in an image forming apparatus of embodiment 3 of the present invention.

As shown by FIG. 14, an image forming apparatus 1 of the embodiment 3, similar to the image forming apparatus 1 of the embodiment 1, together with plural standard image forming apparatuses 3 that interpret the same printer language (PDL (PCL, PS and the like), SIDM), is connected with a user terminal 2 serving as an upper apparatus via network cable 4 such as Ethernet (registration trademark) or cable 4 such as Centronics, USB, RS232C and the like.

The image forming apparatus of the embodiment 3, similar to the image forming apparatus of the embodiment 1, comprises a controlling section 11, an engine control section 12, a paper feeding section 13, a paper ejecting section 14, a paper movement section 15, an operator panel section 16, and a print control section 17. Here, the engine control section 12, the paper feeding section 13, the paper ejecting section 14, the paper movement section 15, the operator panel section 16, and the print control section 17 have the same structure and function as that in embodiment 1.

As shown by FIG. 14, the controlling section 11 includes an I/F sending and receiving process portion 111, a RAM memory 112, an analyzing/editing process portion 113, an expanding process portion 114, a VIDEO process portion 115, a status control portion 116, a panel process portion 117, a non-volatility memory 118, a menu process portion 119, an initializing process portion 120, a selection ID correcting process portion 121, and an engine I/F control portion 122. Here, the I/F sending and receiving process portion 111, the RAM memory 112, the expanding process portion 114, the VIDEO process portion 115, the status control portion 116, the initializing process portion 120, the selection ID correcting process portion 121, and the engine I/F control portion 122 have the same structure and function as that in embodiment 1.

Figure 15:
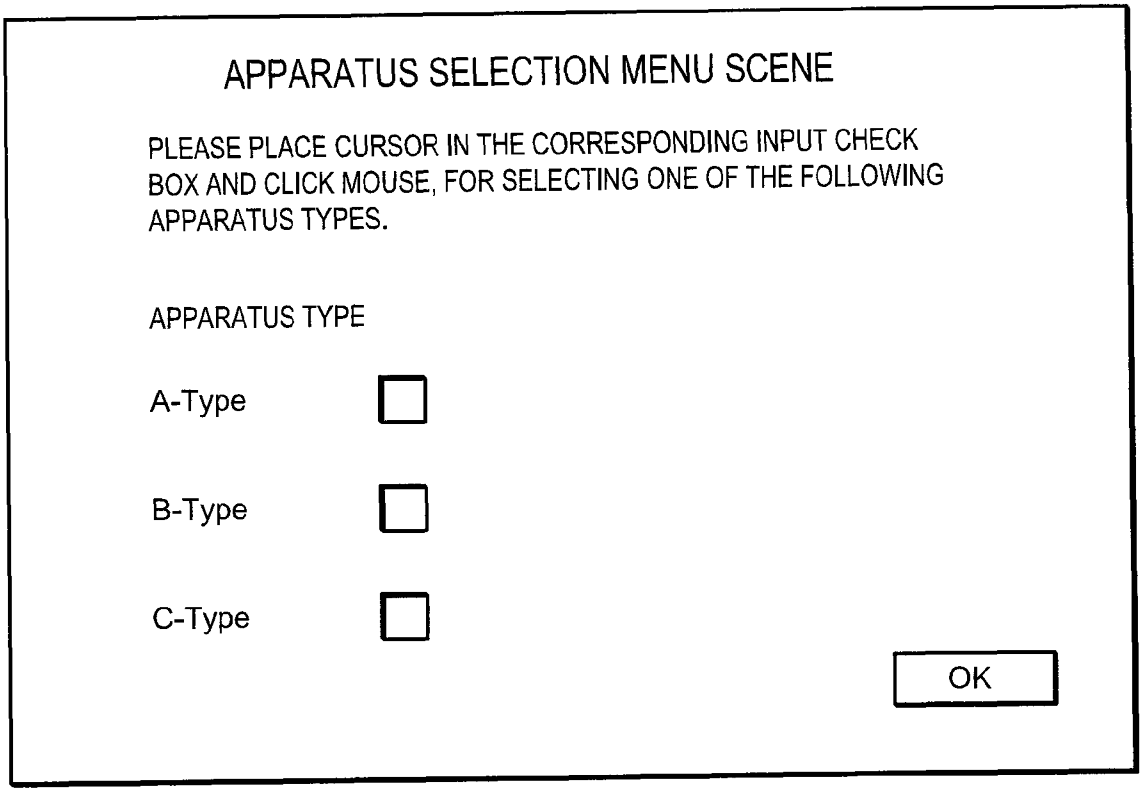
FIG. 15 is a diagram showing an example of apparatus selection menu scene in embodiment 3 of the present invention.
Figure 16:
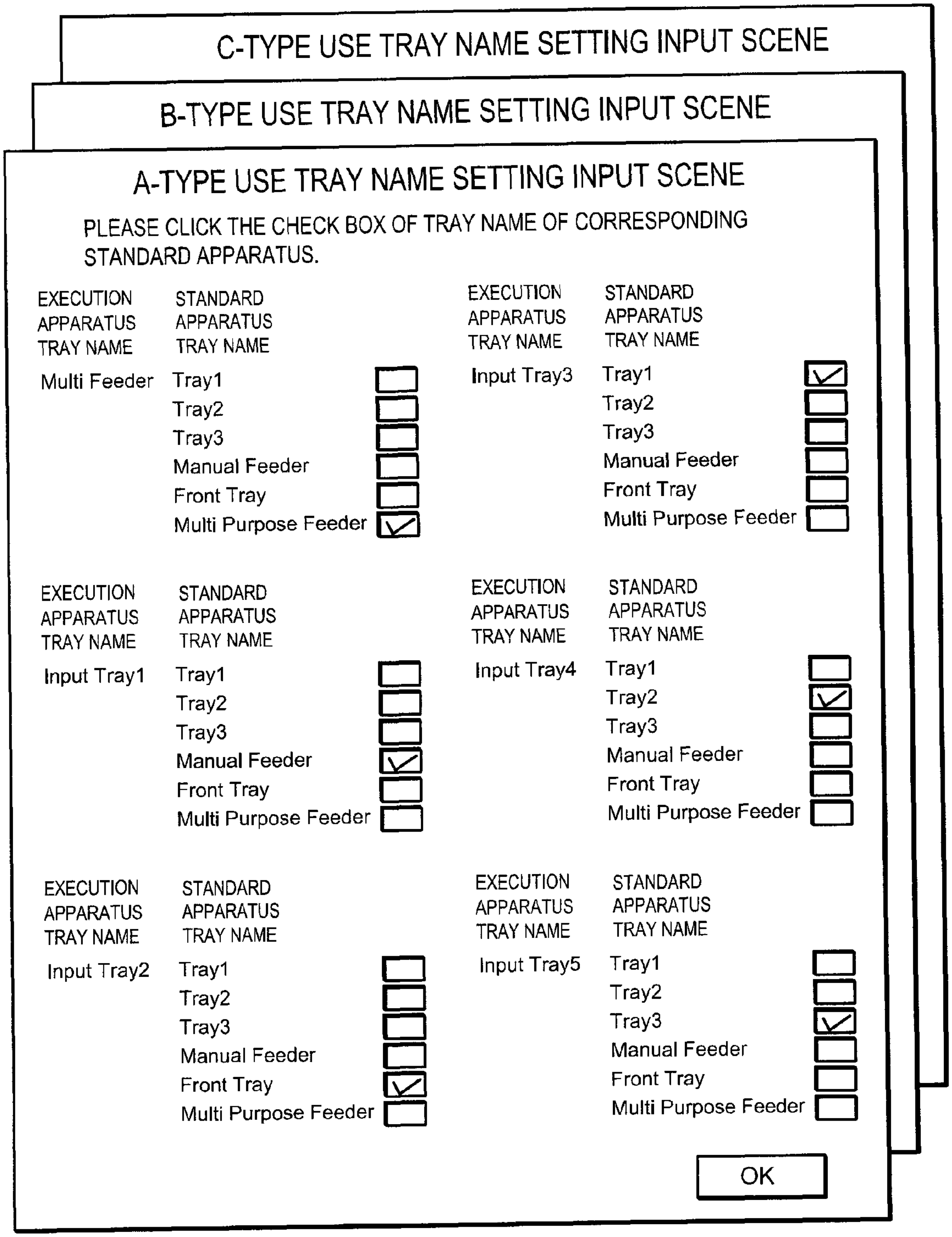
FIG. 16 is a diagram showing an example of A, B, C-Type use tray name setting input scene.

FIG. 15 is a diagram showing an example of apparatus selection menu scene in embodiment 3 of the present invention; and FIG. 16 is a diagram showing an example of A, B, C-Type use tray name setting input scene.

The panel process portion 117 reads out display data used for displaying an apparatus selection menu scene shown by FIG. 15 from the display data storing portion 118*i* of the non-volatility memory 118 via the menu process portion 119, and makes the displaying portion 161 of the operator panel section 16 display the apparatus selection menu scene.

As shown by FIG. 15, in the apparatus selection menu scene, in order to specify apparatus type of the image forming apparatus 1 of the embodiment 3, a display column of A-Type, a display column of B-Type, and a display column of C-Type are displayed; in the respective display columns, check boxes are displayed. Further, in the apparatus selection menu scene, an OK button is displayed.

Further, when one of the check boxes in the display column of A-Type, a display column of B-Type, and a display column of C-Type that are displayed in the apparatus selection menu scene, is clicked and the OK button is clicked by user, the panel process portion 117 reads out display data for displaying type use tray name setting input scene shown by FIG. 16 to correspond to the clicked check box, from the display data storing portion 118*i* of the non-volatility memory 118 via the menu process portion 119; and makes the displaying portion 161 display the type use tray name setting input scene.

As shown by FIG. 16, an A-Type use tray name setting input scene is a display scene for inputting tray name of the standard image forming apparatus 3 of A-Type to correspond to the tray name of image forming apparatus 1 of the embodiment 3, in an execution apparatus tray name display column, as execution apparatus tray name, "Multi Feeder", "Input Tray1", "Input Tray2", "Input Tray3", "Input Tray4", "Input Tray5" are displayed; further, in a standard apparatus tray name display column, as standard apparatus tray name, "Tray1", "Tray2", "Tray3", "Manual Feeder", "Front Tray", "Multi Purpose Feeder" are displayed; furthermore, to correspond to respective names, respective check boxes are displayed. Moreover, an OK button is displayed.

Further, when the OK button displayed in one of type use tray name setting input scenes for A-Type, B-Type, and C-Type, is clicked, the panel process portion 117 reads out the display data of the corresponding type use tray name setting input scene from the non-volatility memory 118 via the menu process portion 119, and makes the displaying portion 161 display a type use stacker name setting input scene according to the type in the read out display data.

Figure 17:
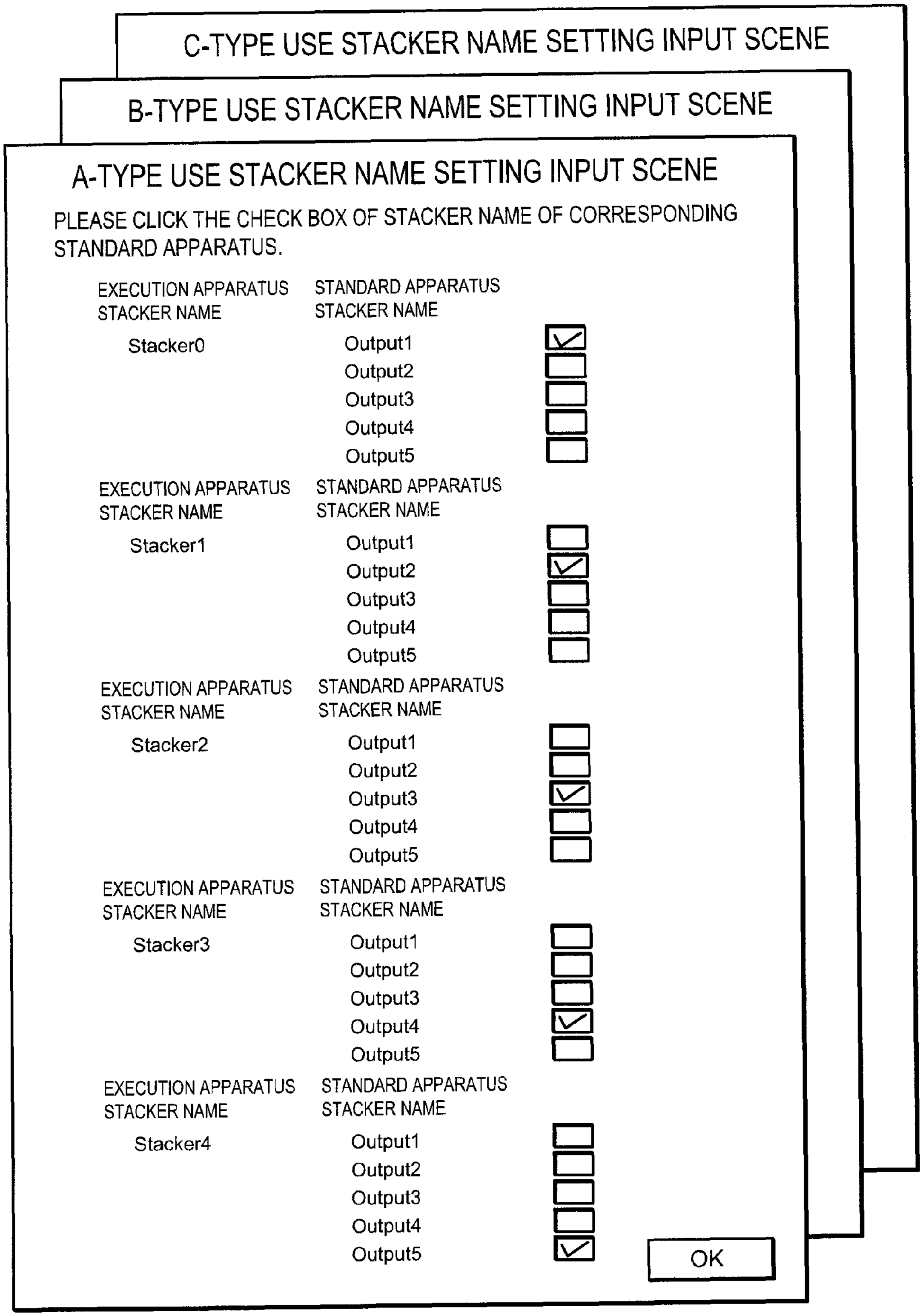
FIG. 17 is a diagram showing an example of A, B, C-Type use stacker name setting input scene.

FIG. 17 is a diagram showing an example of A, B, C-Type use stacker name setting input scene.

For example, As shown by FIG. 17, an A-Type use stacker name setting input scene is a display scene for inputting stacker name of the standard image forming apparatus 3 of A-Type to correspond to the stacker name of image forming apparatus 1 of the embodiment 3, in an execution apparatus stacker name display column, as execution apparatus stacker name, "Stacker0", "Stacker1", "Stacker2", "Stacker3", "Stacker4" are displayed; further, in a standard apparatus stacker name display column, as standard apparatus stacker name, "Output1", "Output2", "Output3", "Output4", "Output5" are displayed; furthermore, to correspond to respective names, respective check boxes are displayed. Moreover, an OK button is displayed.

Further, when tray name input data composed of execution apparatus tray name and standard apparatus tray name are inputted from the displaying portion 161, the panel process portion 117 makes the work area 112*b* of the RAM memory 112 store these tray name input data.

Furthermore, when stacker name input data composed of execution apparatus stacker name and standard apparatus stacker name are inputted from the displaying portion 161, the panel process portion 117 makes the work area 112*b* of the RAM memory 112 store these stacker name input data.

The non-volatility memory 118 has a standard apparatus tray selection ID reference list DB 118*a*, a standard apparatus stacker selection ID reference list DB 118*b*, a tray selection ID change table 118*c*, a stacker selection ID change table 118*d*, an execution apparatus tray selection ID reference list 118*f*, an execution apparatus stacker selection ID reference list 118*g*, and a display data storing portion 118*i*.

Here, the standard apparatus tray selection ID reference list DB 118*a*, the standard apparatus stacker selection ID reference list DB 118*b*, the tray selection ID change table 118*c* and the stacker selection ID change table 118*d* are the same as that in embodiment 1.

FIG. 18A is a diagram to explain execution apparatus tray selection ID reference list in FIG. 14; and FIG. 18B is a diagram to explain execution apparatus stacker selection ID reference list in FIG. 14.

As shown by FIG. 18A, the execution apparatus tray selection ID reference list 118*f* is a list composed of data of execution apparatus tray name of image forming apparatus 1 of the embodiment 3 and execution apparatus tray selection ID assigned to tray of the execution apparatus tray name.

As shown by FIG. 18B, the execution apparatus stacker selection ID reference list 118*g* is a list composed of data of execution apparatus stacker name of image forming apparatus 1 of the embodiment 3 and execution apparatus stacker selection ID assigned to stacker of the execution apparatus stacker name.

The display data storing portion 118*i*, not only stores the same display data as that in embodiment 1, but also stores display data for displaying the apparatus selection menu scene shown by FIG. 15, display data for displaying the type use tray name setting input scenes for A-Type, B-Type, and C-Type shown by FIG. 16, and display data for displaying the type use stacker name setting input scenes for A-Type, B-Type, and C-Type shown by FIG. 17.

The menu process portion 119 reads out the execution apparatus tray selection ID corresponding to the execution apparatus tray name described in the tray name input data read out from the work area 112*b* of the RAM memory 112, from the execution apparatus tray selection ID reference list 118*f*. Further, the menu process portion 119 reads out the standard apparatus tray selection ID corresponding to the standard apparatus tray name described in the tray name input data that has been previously read out, and the tray No., from the standard apparatus tray selection ID reference list DB 118*a*.

Then, the menu process portion 119 generates tray selection ID change data from the standard apparatus tray selection ID, the tray No. and the execution apparatus tray selection ID, according to an order of the tray No., the standard apparatus tray selection ID and the execution apparatus tray selection ID; and registers the tray selection ID change data into the tray selection ID change table 118*c*.

Furthermore, the menu process portion 119 reads out the execution apparatus stacker selection ID corresponding to the execution apparatus stacker name described in the stacker name input data read out from the work area 112*b* of the RAM memory 112, from the execution apparatus stacker selection ID reference list 118*g*. Further, the menu process portion 119 reads out the standard apparatus stacker selection ID corresponding to the standard apparatus stacker name described in the stacker name input data that has been previously read out, and the stacker No., from the standard apparatus stacker selection ID reference list DB 118*b*.

Then, the menu process portion 119 generates stacker selection ID change data from the standard apparatus stacker selection ID, the stacker No. and the execution apparatus stacker selection ID, according to an order of the stacker No., the standard apparatus stacker selection ID and the execution apparatus stacker selection ID; and registers the stacker selection ID change data into the stacker selection ID change table 118*d* that is not completely made yet.

Next, it is to explain operation of the image forming apparatus in the embodiment 3 of the present invention, till the tray selection ID change table 118*c* and the stacker selection ID change table 118*d* are made. Moreover, regarding the operation to actually execute a print process after these tables are made, because it is the same as that in embodiment 1, its explanation is omitted.

Figure 19A:
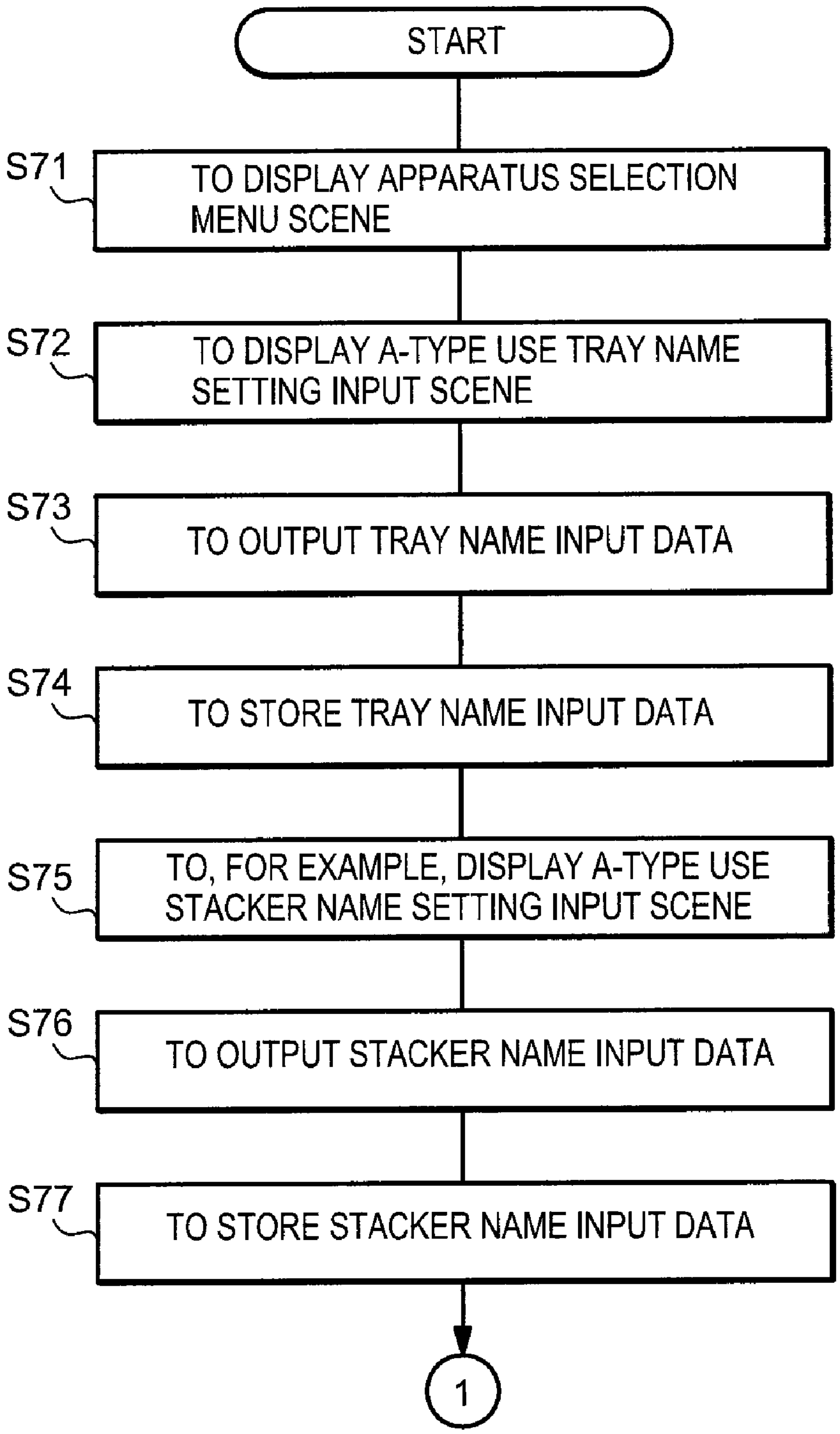
FIG. 19A is a flowchart for explaining operation of an image forming apparatus in embodiment 3 of the present invention (I)
Figure 19B:
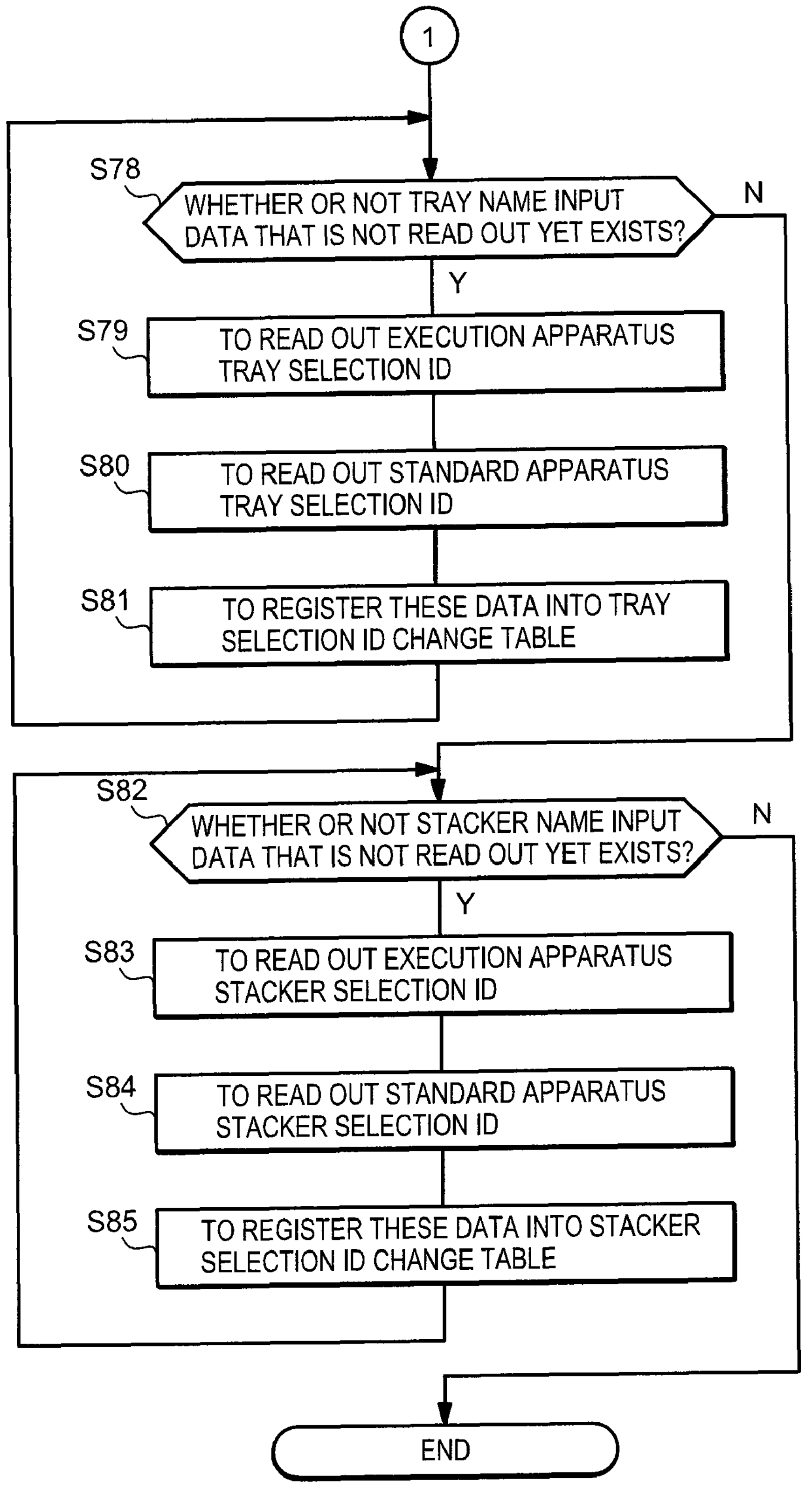
FIG. 19B is a flowchart for explaining operation of an image forming apparatus in embodiment 3 of the present invention (II)

FIG. 19A is a flowchart for explaining operation of an image forming apparatus in embodiment 3 of the present invention (I); and FIG. 19B is a flowchart for explaining operation of an image forming apparatus in embodiment 3 of the present invention (II).

User uses the operation keys provided on the operating portion 162 of the operator panel section 16 to display the apparatus selection menu scene shown by FIG. 15 on the displaying portion 161 (Step S71). Next, after user clicks the check box in the place of "A-Type" in the apparatus selection menu scene and clicks the OK button, the operator panel section 16 outputs a notification representing that the check box in the place of "A-Type" in the apparatus selection menu scene is clicked to the panel process portion 117.

The panel process portion 117, after received the notification representing that the check box in the place of "A-Type" in the apparatus selection menu scene is clicked, outputs the notification to the menu process portion 119.

The menu process portion 119, when received the notification from the panel process portion 117, reads out the display data for displaying the A-Type use tray name setting input scene on the displaying portion 161, from the display data storing portion 118*i* of the non-volatility memory 118; and outputs the display data to the panel process portion 117.

The panel process portion 117, after received the display data from the menu process portion 119, makes the displaying portion 161 display the A-Type use tray name setting input scene shown by FIG. 16 (Step S72).

Later, after the user used the various keys furnished on the operating portion 162 to perform input shown by FIG. 16 and click the OK button, the displaying portion 161 outputs tray name input data represented below to the panel process portion 117 (Step S73).

In the tray name input data outputted to the panel process portion 117, as shown by FIG. 16, 1) tray name input data composed of execution apparatus tray name of "Multi Feeder" and standard apparatus tray name of "Multi Purpose Feeder"; 2) tray name input data composed of execution apparatus tray name of "Input Tray1" and standard apparatus tray name of "Manual Feeder"; 3) tray name input data composed of execution apparatus tray name of "Input Tray2" and standard apparatus tray name of "Front Tray"; 4) tray name input data composed of execution apparatus tray name of "Input Tray3" and standard apparatus tray name of "Tray1"; 5) tray name input data composed of execution apparatus tray name of "Input Tray4" and standard apparatus tray name of "Tray2"; and 5) tray name input data composed of execution apparatus tray name of "Input Tray5" and standard apparatus tray name of "Tray3", are described.

The panel process portion 117 makes these tray name input data be stored in the work area 112*b* of the RAM memory 112, (Step S74), and outputs a notification representing that the OK button displayed in the A-Type use tray name setting input scene is clicked, to the menu process portion 119.

The menu process portion 119 reads out the display data for displaying the A-Type use stacker name setting input scene shown by FIG. 17 on the displaying portion 161, from the display data storing portion 118*i* of the non-volatility memory 118; and outputs the display data to the panel process portion 117.

The panel process portion 117, after received the display data from the menu process portion 119, makes the displaying portion 161 display the A-Type use stacker name setting input scene shown by FIG. 17 (Step S75).

Later, after the user used the various keys furnished on the operating portion 162 to perform input, for example, shown by FIG. 17 and click the OK button, the displaying portion 161 outputs stacker name input data represented below to the panel process portion 117 (Step S76).

In the stacker name input data outputted to the panel process portion 117, as shown by FIG. 17, 1) stacker name input data composed of execution apparatus stacker name of "Stacker0" and standard apparatus stacker name of "Output1"; 2) stacker name input data composed of execution apparatus stacker name of "Stacker1" and standard apparatus stacker name of "Output2"; 3) stacker name input data composed of execution apparatus stacker name of "Stacker2" and standard apparatus stacker name of "Output3"; 4) stacker name input data composed of execution apparatus stacker name of "Stacker3" and standard apparatus stacker name of "Output4"; and 5) stacker name input data composed of execution apparatus stacker name of "Stacker4" and standard apparatus stacker name of "Output5", are described.

The panel process portion 117 makes these stacker name input data be stored in the work area 112*b* of the RAM memory 112, (Step S77), and outputs a notification representing that the OK button displayed in the A-Type use stacker name setting input scene is clicked, to the menu process portion 119.

The menu process portion 119 judges whether or not tray name input data that is not read out yet is stored in the work area 112*b* of the RAM memory 112 (Step S78). On the one hand, the menu process portion 119, in the case to judge that tray name input data that is not read out yet is not stored in the work area 112*b* of the RAM memory 112 (Step S78, NO), identifies that the tray selection ID change table 118*c* has been generated, and moves to process step S82.

On the other hand, the menu process portion 119, in the case to judge that tray name input data that is not read out yet is stored in the work area 112*b* of the RAM memory 112 (Step S78, YES), reads out the tray name input data that is not read out yet from the work area 112*b* of the RAM memory 112. Next, the menu process portion 119 reads out the execution apparatus tray selection ID corresponding to the execution apparatus tray name described in the read out tray name input data from the execution apparatus tray selection ID reference list 118*f* (Step S79); and reads out the standard apparatus tray selection ID and the tray No. corresponding to the standard apparatus tray name described in the read out tray name input data from the standard apparatus tray selection ID reference list DB 118*a* (Step S80).

The menu process portion 119, after read the execution apparatus tray selection ID, the standard apparatus tray selection ID and the tray No., generates tray selection ID change data composed of the tray No., the standard apparatus tray selection ID and the execution apparatus tray selection ID; and registers the tray selection ID change data into the tray selection ID change table 118*c* that is not completely generated (Step S81). Then, the menu process portion 119 moves to process step S78 and continues the same process stated above.

In the step S78, if judged that tray name input data that is not read out yet is not stored in the work area 112*b* of the RAM memory 112 (Step S78, NO), the menu process portion 119 judges whether or not stacker name input data that is not read out yet is stored in the work area 112*b* of the RAM memory 112 (Step S82). On the one hand, the menu process portion 119, in the case to judge that stacker name input data that is not read out yet is not stored in the work area 112*b* of the RAM memory 112 (Step S82, NO), identifies that the stacker selection ID change table 118*d* has been generated, and ends the process.

On the other hand, the menu process portion 119, in the case to judge that stacker name input data that is not read out yet is stored in the work area 112*b* of the RAM memory 112 (Step S82, YES), reads out the stacker name input data that is not read out yet from the work area 112*b* of the RAM memory 112. Next, the menu process portion 119 reads out the execution apparatus stacker selection ID corresponding to the execution apparatus stacker name described in the read out stacker name input data from the execution apparatus stacker selection ID reference list 118*g* (Step S83); and reads out the standard apparatus stacker selection ID and the stacker No. corresponding to the standard apparatus stacker name described in the read out stacker name input data from the standard apparatus stacker selection ID reference list DB 118*b* (Step S84).

The menu process portion 119, after read the execution apparatus stacker selection ID, the standard apparatus stacker selection ID and the stacker No., generates stacker selection ID change data composed of the stacker No., the standard apparatus stacker selection ID and the execution apparatus stacker selection ID; and registers the stacker selection ID change data into the stacker selection ID change table 118*d* that is not completely generated (Step S85). Then, the menu process portion 119 moves to process step S82 and continues the same process stated above.

According to the embodiment 3, after displayed the apparatus selection menu scene shown by FIG. 15 and displayed any of the type use tray name setting input scenes for A-Type, B-Type, and C-Type shown by FIG. 16, onto the operator panel section 16, on the basis of the information inputted to the tray name setting input scene, the menu process portion 119 refers to the execution apparatus tray selection ID reference list 118*f* and the standard apparatus tray selection ID reference list DB 118*a*, generates the tray selection ID change data from the execution apparatus tray name inputted from the panel process portion 117 and from the standard apparatus tray name so as to form the tray selection ID change table 118*c*, therefore, in the case to use image forming apparatus of various type, it is possible to simply update the tray selection ID change table 118*c* for user.

Further, according to the embodiment 3, after displayed the apparatus selection menu scene shown by FIG. 15 and displayed any of the type use stacker name setting input scenes for A-Type, B-Type, and C-Type shown by FIG. 17, onto the operator panel section 16, on the basis of the information inputted to the stacker name setting input scene, the menu process portion 119 refers to the execution apparatus stacker selection ID reference list 118*g* and the standard apparatus stacker selection ID reference list DB 118*b*, generates the stacker selection ID change data from the execution apparatus stacker name inputted from the panel process portion 117 and from the standard apparatus stacker name so as to form the stacker selection ID change table 118*d*, therefore, in the case to use image forming apparatus of various type, it is possible to simply update the stacker selection ID change table 118*d* for user.

Embodiment 4

Figure 20:
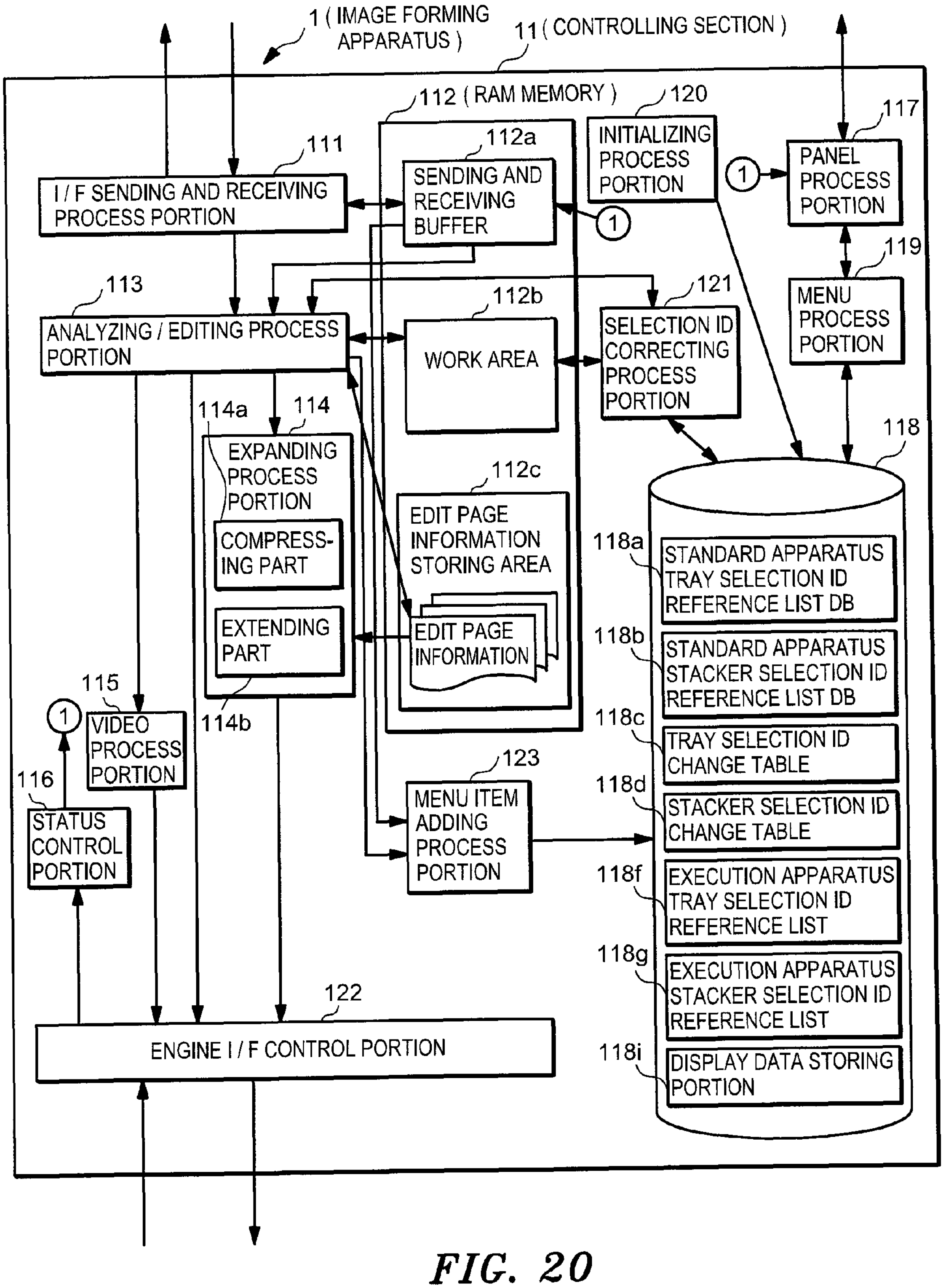
FIG. 20 is a block diagram showing a structure of controlling section in an image forming apparatus of embodiment 4 of the present invention.

FIG. 20 is a block diagram showing a structure of controlling section in an image forming apparatus of embodiment 4 of the present invention.

As shown by FIG. 20, an image forming apparatus 1 of the embodiment 4, similar to the image forming apparatus 1 of the embodiment 3, is connected with a user terminal 2 serving as an upper apparatus via network cable 4 such as Ethernet (registration trademark) or cable 4 such as Centronics, USB, RS232C and the like.

The image forming apparatus of the embodiment 4, as shown by FIG. 2, comprises a controlling section 11, an engine control section 12, a paper feeding section 13, a paper ejecting section 14, a paper movement section 15, an operator panel section 16, and a print control section 17. Here, the engine control section 12, the paper feeding section 13, the paper ejecting section 14, the paper movement section 15, and the print control section 17 have the same structure and function as that in embodiment 3.

Figure 21:
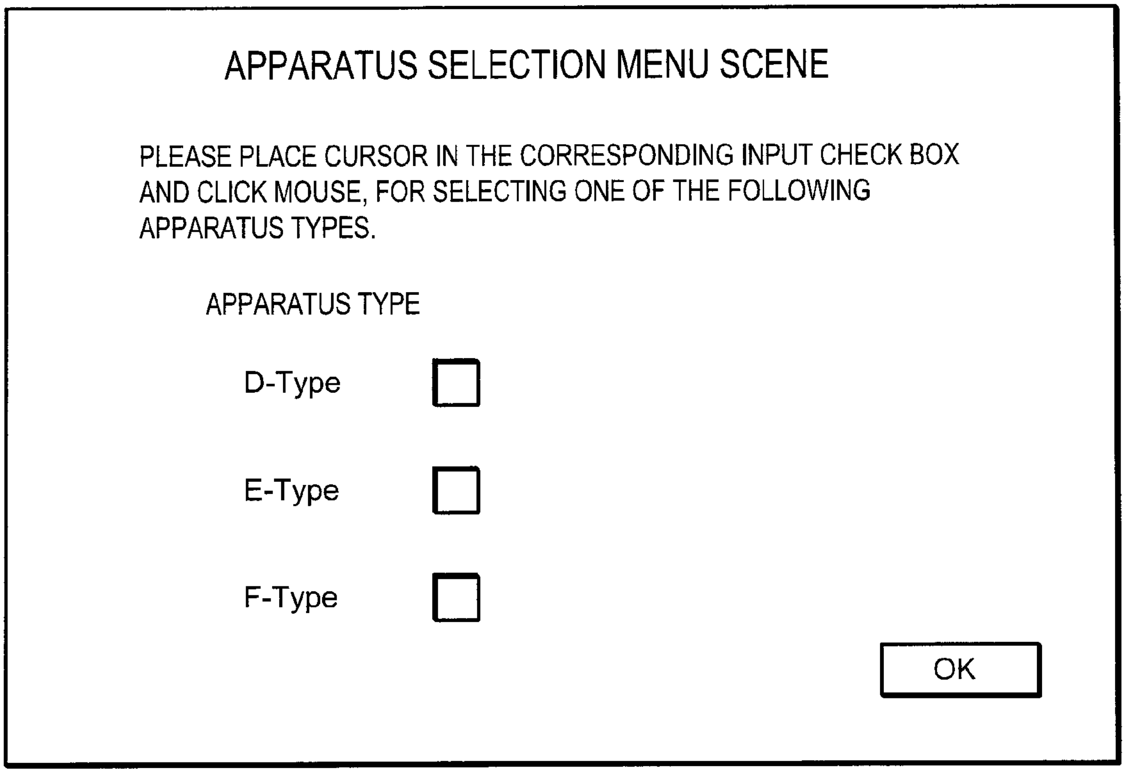
FIG. 21 is a diagram showing an example of apparatus selection menu scene in embodiment 4 of the present invention.

The operator panel section 16, not only has the same function as the operator panel section 16 in the embodiment 3, but also has a function to display an apparatus selection menu scene shown by FIG. 21.

FIG. 21 is a diagram showing an example of apparatus selection menu scene in embodiment 4 of the present invention.

An apparatus selection menu scene shown by FIG. 21 is a display scene used for registering display data of new type use tray name setting input scene and display data of new type use stacker name setting input scene, except the display data of the type use tray name setting input scenes for A-Type, B-Type, C-Type and the display data of the type use stacker name setting input scenes for A-Type, B-Type, C-Type that are stored in the display data storing portion 118*i* of the non-volatility memory 118.

As shown by FIG. 20, the controlling section 11 includes an I/F sending and receiving process portion 111, a RAM memory 112, an analyzing/editing process portion 113, an expanding process portion 114, a VIDEO process portion 115, a status control portion 116, a panel process portion 117, a non-volatility memory 118, a menu process portion 119, an initializing process portion 120, a selection ID correcting process portion 121, an engine I/F control portion 122 and a menu item adding process portion 123. Here, the I/F sending and receiving process portion 111, the RAM memory 112, the expanding process portion 114, the VIDEO process portion 115, the status control portion 116, the panel process portion 117, the menu process portion 119, the initializing process portion 120, the selection ID correcting process portion 121, and the engine I/F control portion 122 have the same structure and function as that in embodiment 3.

Figure 22:
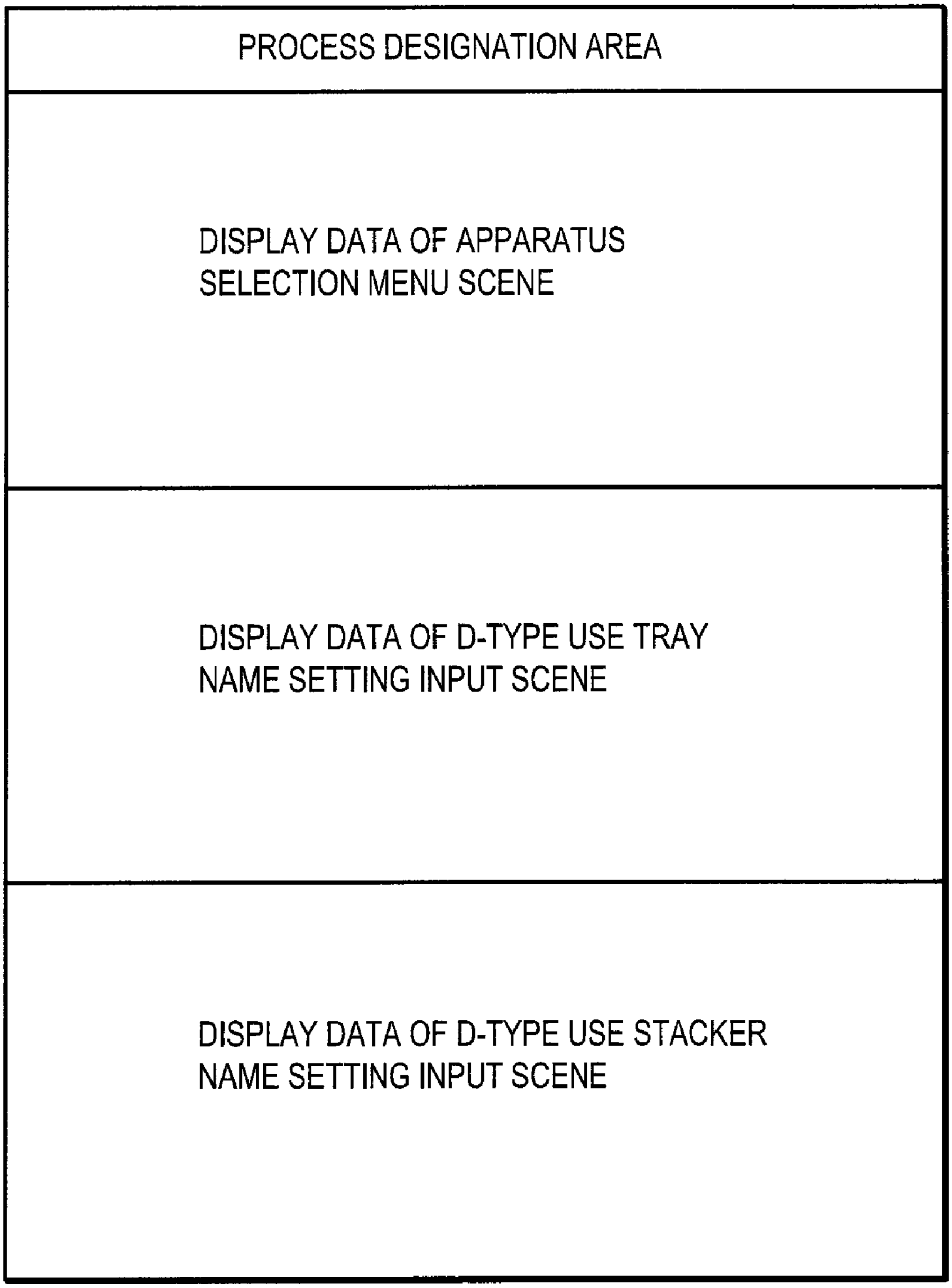
FIG. 22 is a diagram to explain print JOB data in embodiment 4 of the present invention.

FIG. 22 is a diagram to explain print JOB data in embodiment 4 of the present invention.

The analyzing/editing process portion 113 has the same function as the analyzing/editing process portion 113 in embodiment 3, further has a function to output a request to the menu item adding process portion 123 for registering the display data of new type use tray name setting input scene and the display data of new type use stacker name setting input scene into display data storing portion 118*i* of the non-volatility memory 118, after confirmed that information for requesting to add a menu item into a process designation area shown by FIG. 22 is described in the print JOB data received from the user terminal 2.

Moreover, in the print JOB data received from the user terminal 2, for example, as shown by FIG. 22, the display data of new type use tray name setting input scene and the display data of new type use stacker name setting input scene to be registered into the process designation area mention above and into the display data storing portion 118*i*, are described.

The non-volatility memory 118 has a standard apparatus tray selection ID reference list DB 118*a*, a standard apparatus stacker selection ID reference list DB 118*b*, a tray selection ID change table 118*c*, a stacker selection ID change table 118*d*, an execution apparatus tray selection ID reference list 118*f*, an execution apparatus stacker selection ID reference list 118*g*, and a display data storing portion 118*i*.

Here, the standard apparatus tray selection ID reference list DB 118*a*, the standard apparatus stacker selection ID reference list DB 118*b*, the tray selection ID change table 118*c*, the stacker selection ID change table 118*d*, the execution apparatus tray selection ID reference list 118*f* and the execution apparatus stacker selection ID reference list 118*g* are the same as that in embodiment 3.

The display data storing portion 118*i*, not only stores the same display data as that in embodiment 3, but also stores display data for displaying the apparatus selection menu scene, the display data of new type use tray name setting input scene and the display data of new type use stacker name setting input scene.

The menu item adding process portion 123, when received the request stated above from the analyzing/editing process portion 113, reads out the display data of new type use tray name setting input scene and the display data of new type use stacker name setting input scene that are described in the print JOB data stored in the sending and receiving buffer 112*a* of the RAM memory 112, and registers these display data into the display data storing portion 118*i*.

The user terminal 2 comprises a controlling section (not shown), a storing section (not shown), a displaying section (not shown), an operating section (not shown), and a sending and receiving section (not shown). In the user terminal 2, the controlling section generates the print JOB data shown by FIG. 22, on the basis of information inputted from the displaying section by used, according to control program stored in the storing section. Further, the sending and receiving section sends the generated print JOB data to the image forming apparatus 1 of the embodiment 4 via the cable 4.

Next, it is to explain operation of the image forming apparatus in the embodiment 4 of the present invention, after the print JOB data in which information to request to add menu item is described is received from the user terminal 2.

Figure 23:
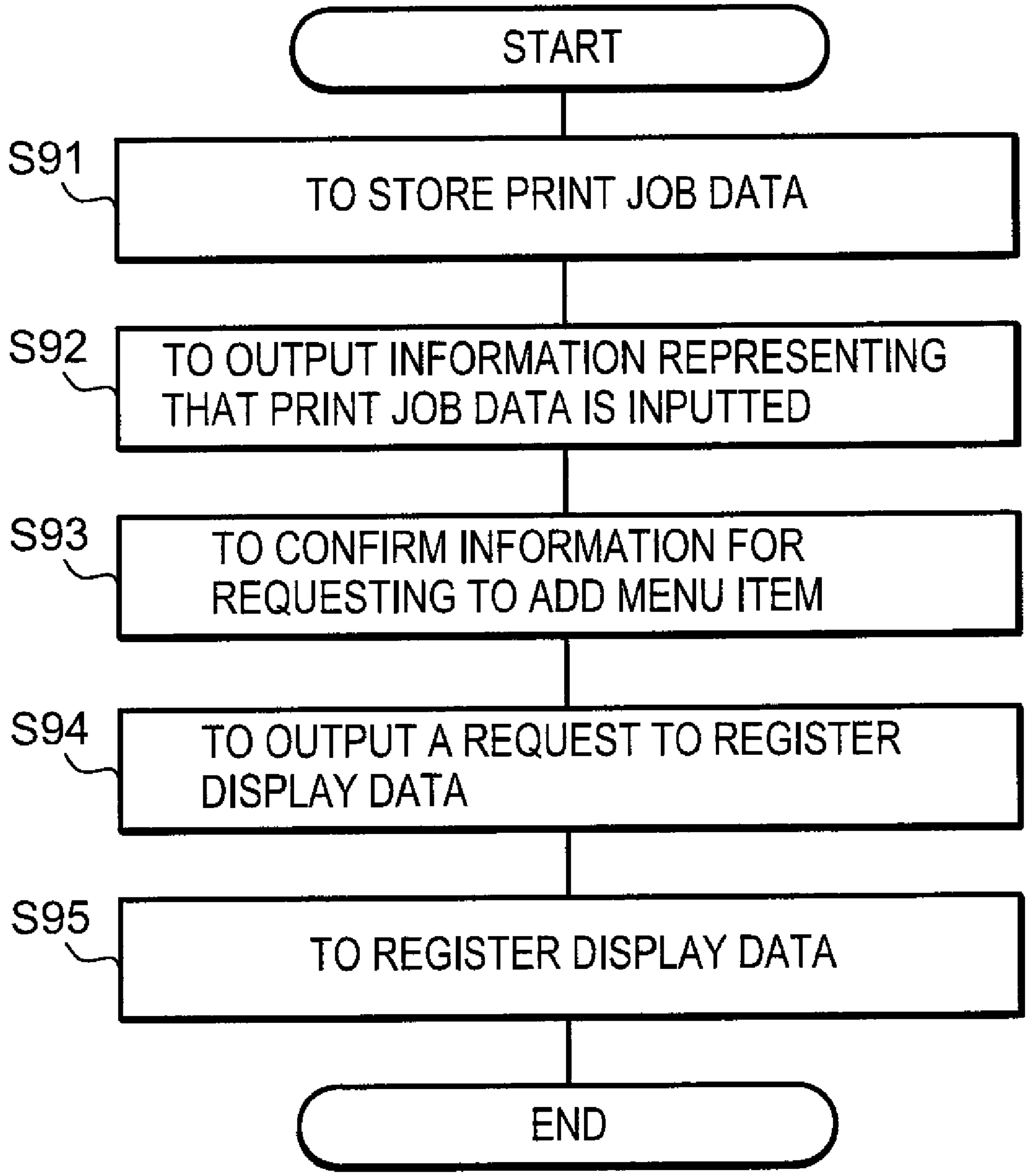
FIG. 23 is a flowchart for explaining operation of an image forming apparatus in embodiment 4 of the present invention.

FIG. 23 is a flowchart for explaining operation of an image forming apparatus in embodiment 4 of the present invention, after the print JOB data in which information to request to add menu item is described is received from the user terminal 2. Moreover, regarding the operation to actually execute a print process for the print JOB data, because it is the same as that in embodiment 1, its explanation is omitted.

The I/F sending and receiving process portion 111, when received the print JOB data, for example, shown by FIG. 22, from the user terminal 2, makes the print JOB data be stored temporarily into the sending and receiving buffer 112*a* of the RAM memory 112 (Step S91); and outputs a notification representing that the print JOB data has been received to the analyzing/editing process portion 113 (Step S92).

Then, the analyzing/editing process portion 113 reads out the print JOB data from the sending and receiving buffer 112*a* and confirms that information to request to add menu item is described in the process designation area in the print JOB data (Step S93), further outputs a request to the menu item adding process portion 123 for registering the display data of new type use tray name setting input scene and the display data of new type use stacker name setting input scene into display data storing portion 118*i* into the display data storing portion 118*i* of the non-volatility memory 118 (Step S94).

The menu item adding process portion 123, when received the request stated above from the analyzing/editing process portion 113, reads out the display data of the apparatus selection menu scene, the display data of new type use tray name setting input scene for D-Type, and the display data of new type use stacker name setting input scene for D-Type that are described in the print JOB data stored in the sending and receiving buffer 112*a* of the RAM memory 112, and registers these display data into the display data storing portion 118*i* of the non-volatility memory 118 (Step S95). Then, the process is ended.

According to the embodiment 4, because the menu item adding process portion 123 makes the display data of the apparatus selection menu scene, the display data of new type use tray name setting input scene for D-Type, and the display data of new type use stacker name setting input scene for D-Type be stored in the display data storing portion 118*i* of the non-volatility memory 118, it is possible to obtain more setting information to set the tray selection ID and the stacker selection ID for user.

Embodiment 5

Figure 24:
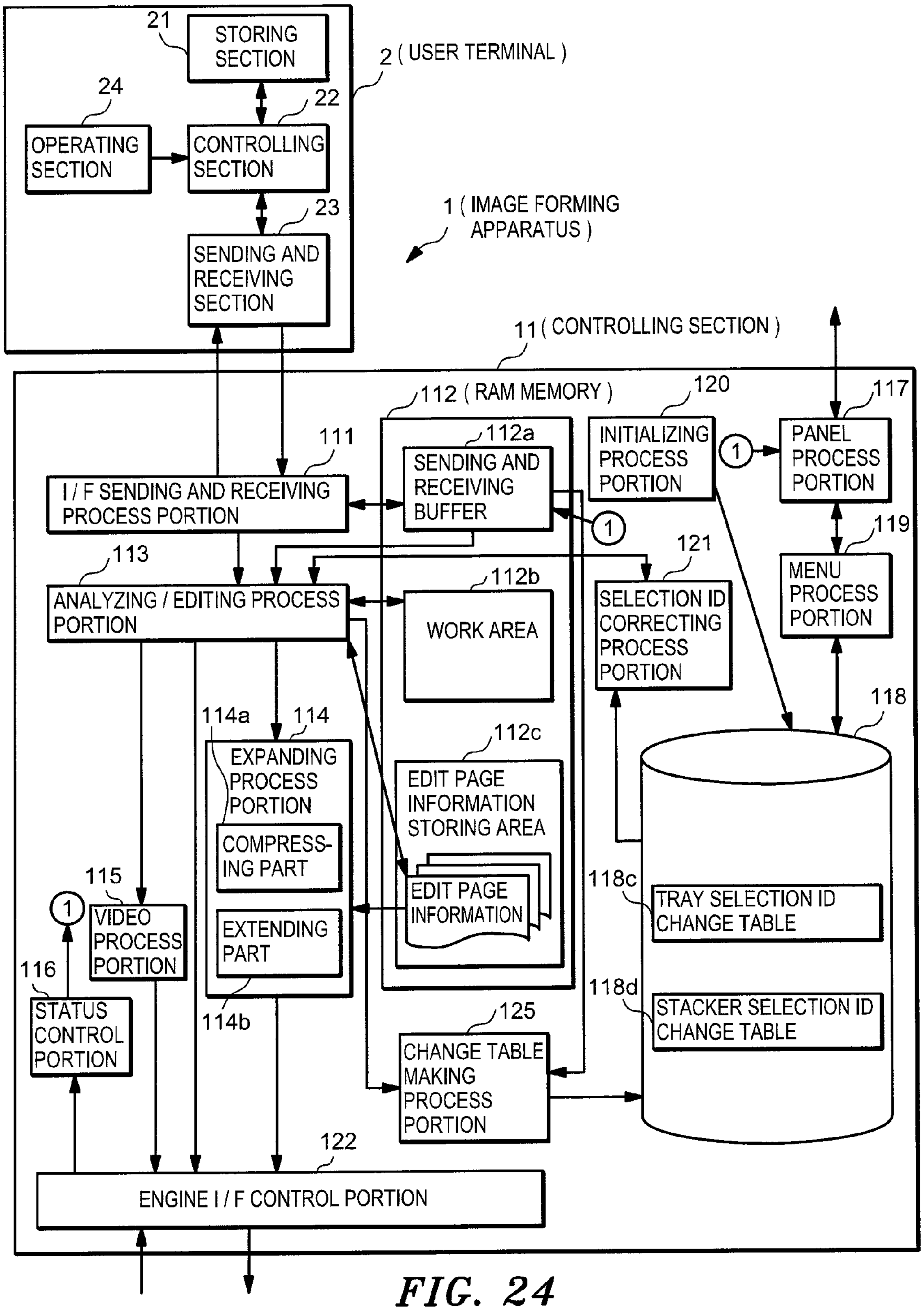
FIG. 24 is a block diagram showing a structure of controlling section in an image forming apparatus of embodiment 5 of the present invention.

FIG. 24 is a block diagram showing a structure of controlling section in an image forming apparatus of embodiment 5 of the present invention As shown by FIG. 24, an image forming apparatus 1 of the embodiment 4, similar to the image forming apparatus 1 of the embodiment 4, is connected with a user terminal 2 serving as an upper apparatus via network cable 4 such as Ethernet (registration trademark) or cable 4 such as Centronics, USB, RS232C and the like.

The image forming apparatus of the embodiment 5, as shown by FIG. 2, comprises a controlling section 11, an engine control section 12, a paper feeding section 13, a paper ejecting section 14, a paper movement section 15, an operator panel section 16, and a print control section 17. Here, the engine control section 12, the paper feeding section 13, the paper ejecting section 14, the paper movement section 15, the operator panel section 16 and the print control section 17 have the same structure and function as that in embodiment 4.

As shown by FIG. 24, the controlling section 11 includes an I/F sending and receiving process portion 111, a RAM memory 112, an analyzing/editing process portion 113, an expanding process portion 114, a VIDEO process portion 115, a status control portion 116, a panel process portion 117, a non-volatility memory 118, a menu process portion 119, an initializing process portion 120, a selection ID correcting process portion 121, an engine I/F control portion 122, and a change table making process portion 125. Here, the I/F sending and receiving process portion 111, the RAM memory 112, the expanding process portion 114, the VIDEO process portion 115, the status control portion 116, the panel process portion 117, the menu process portion 119, the initializing process portion 120, the selection ID correcting process portion 121, and the engine I/F control portion 122 have the same structure and function as that in embodiment 4.

Figure 25:
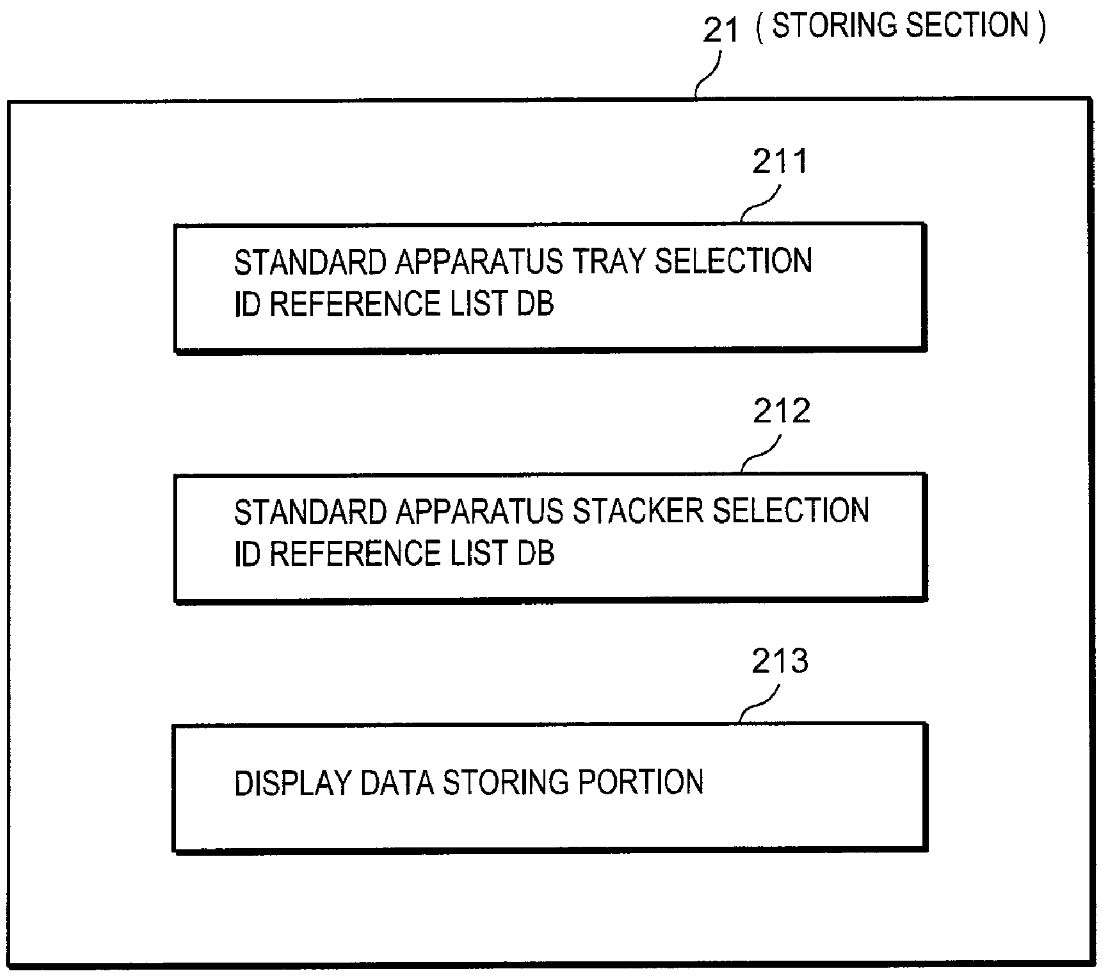
FIG. 25 is a diagram showing a structure of a storing section in FIG. 24.
Figure 26:
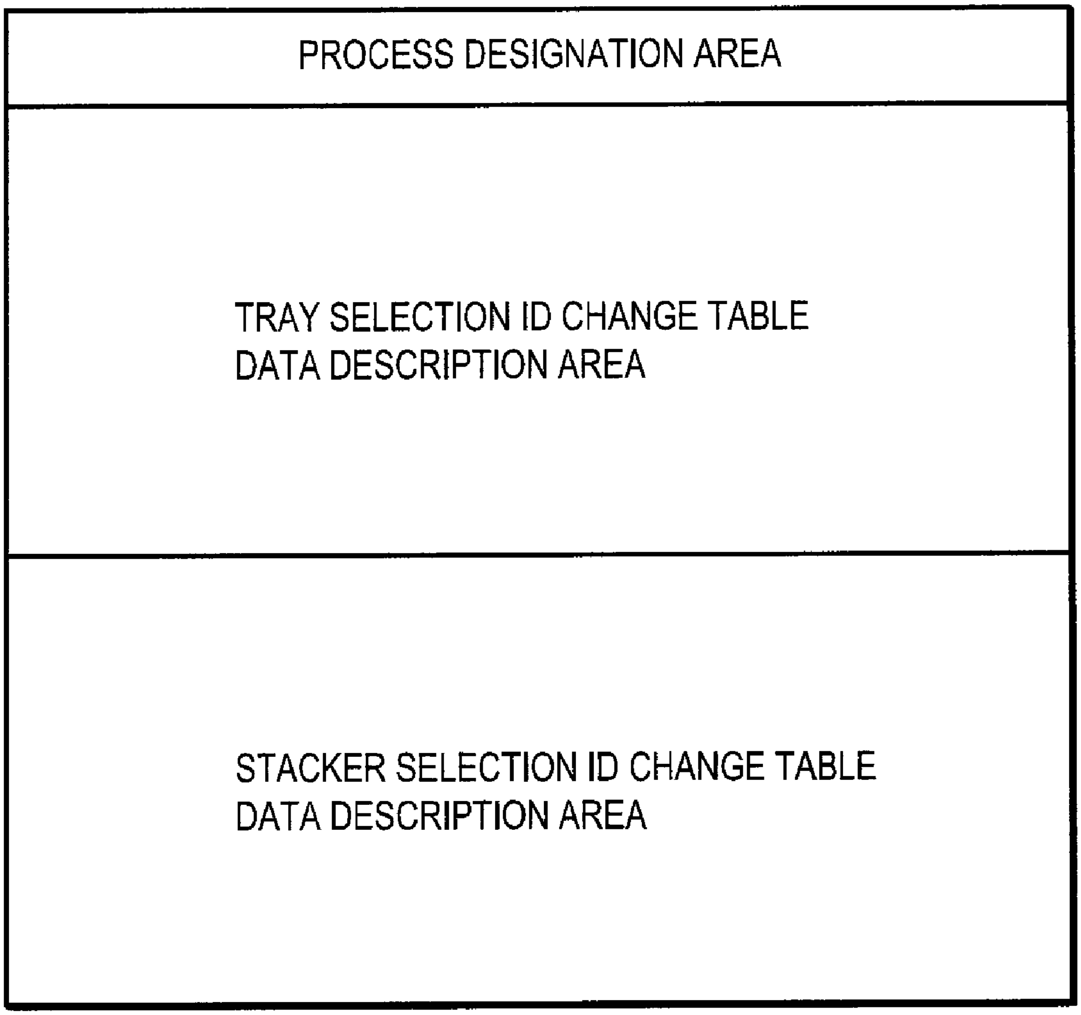
FIG. 26 is a diagram to explain print JOB data in embodiment 5 of the present invention.

FIG. 25 is a diagram showing a structure of a storing section in FIG. 24; and FIG. 26 is a diagram to explain print JOB data in embodiment 5 of the present invention.

The analyzing/editing process portion 113 has the same function as the analyzing/editing process portion 113 in embodiment 4, further has a function to read out information described in the process designation area (refer to FIG. 26) of print JOB data (described below) stored in the sending and receiving buffer 112*a* of the RAM memory 112; and in the case that the information represents a table making request, outputs a making request to the change table making process portion 125 for making a tray selection ID change table and a stacker selection ID change table.

The change table making process portion 125 sequentially reads out tray selection ID change table data from tray selection ID change table data description area of print JOB data stored in the sending and receiving buffer 112*a* of the RAM memory 112, and stacker selection ID change table data from stacker selection ID change table data description area of print JOB data stored in the sending and receiving buffer 112*a* of the RAM memory 112. Then, the change table making process portion 125 generates a tray selection ID change table 118*c* and a stacker selection ID change table 118*d* from the tray selection ID change table data and the stacker selection ID change table data that have been read out. Moreover, regarding the generating method of the tray selection ID change table 118*c* and the stacker selection ID change table 118*d*, it will be explained in the explanation of operation.

The user terminal 2 comprises a storing section 21, a controlling section 22, a sending and receiving section 23 and an operating section 24. The controlling section 22 and the sending and receiving section 23 are formed through CPU executes control program (not shown) stored in the storing section 21, and have the following functions.

The storing section 21 is formed from RAM, ROM, and hard disk unit; and as shown by FIG. 25, has a standard apparatus tray selection ID reference list DB 211, a standard apparatus stacker selection ID reference list DB 212, and a display data storing portion 213.

The standard apparatus tray selection ID reference list DB 211 stores standard apparatus tray selection ID reference lists whose emulation names respectively are PCL, PS and SIDM. In these standard apparatus tray selection ID reference lists whose emulation names respectively are PCL, PS and SIDM, as shown by FIG. 6A, data respectively described, each data is composed of emulation name used by the standard image forming apparatus 3; tray No. assigned to the standard image forming apparatus 3; standard apparatus tray name furnished to correspond to the tray No.; and standard apparatus tray selection ID assigned to the tray of the standard apparatus tray name.

The standard apparatus stacker selection ID reference list DB 212 stores standard apparatus stacker selection ID reference lists whose emulation names respectively are PCL, PS and SIDM. In these standard apparatus stacker selection ID reference lists whose emulation names respectively are PCL, PS and SIDM, as shown by FIG. 6B, data respectively described, each data is composed of emulation name used by the standard image forming apparatus 3; stacker No assigned to the standard image forming apparatus 3; standard apparatus stacker name furnished to correspond to the stacker No; and standard apparatus stacker selection ID assigned to the stacker of the standard apparatus stacker name.

The display data storing portion 213 stores display data for displaying scene onto the operating section 24. As the display data, for example, it may be data to display the tray/stacker selection ID input scene shown by FIG. 5 in embodiment 1.

The controlling section 22, when received emulation name, tray No., execution apparatus tray selection ID and emulation name, stacker No., execution apparatus stacker selection ID, generates the same tray selection ID input data including the emulation name, the tray No., the execution apparatus tray selection ID as that in embodiment 1; and generates the same stacker selection ID input data including the emulation name, the stacker No., the execution apparatus stacker selection ID as that in embodiment 1.

Further, the controlling section 22 reads out standard apparatus tray selection ID corresponding to the tray No. described in the generated tray selection ID input data, from the standard apparatus tray selection ID reference list of the emulation name described in the tray selection ID input data that has been previously read out, in the standard apparatus tray selection ID reference lists stored in the standard apparatus tray selection ID reference list DB 211. Next, the controlling section 22 generates tray selection ID change table data composed of the tray No. described in the tray selection ID input data, the standard apparatus tray selection ID that is previously read out from the standard apparatus tray selection ID reference list, and the execution apparatus tray selection ID described in the tray selection ID input data; and registers the tray selection ID change table data into a work area (not shown) of the storing section 21.

Furthermore, the controlling section 22 reads out standard apparatus stacker selection ID corresponding to the stacker No. described in the generated stacker selection ID input data, from the standard apparatus stacker selection ID reference list of the emulation name described in the stacker selection ID input data that has been previously read out, in the standard apparatus stacker selection ID reference lists stored in the standard apparatus stacker selection ID reference list DB 212. Next, the controlling section 22 generates stacker selection ID change table data composed of the stacker No. described in the stacker selection ID input data, the standard apparatus stacker selection ID that is previously read out from the standard apparatus stacker selection ID reference list, and the execution apparatus stacker selection ID described in the stacker selection ID input data; and registers the stacker selection ID change table data into a work area (not shown) of the storing section 21.

Moreover, the controlling section 22, as shown by FIG. 26, describes information representing a making request of change table into process designation area, describes the tray selection ID change table data stored in the work area into the tray selection ID change table description area, and describes the stacker selection ID change table data stored in the work area into the stacker selection ID change table description area so as to generate print JOB data; and outputs the print JOB data to the sending and receiving section 23.

The sending and receiving section 23 sends the print JOB data to the image forming apparatus 1, and receives status information indicating state of the image forming apparatus 1 from the image forming apparatus 1.

The operating section 24 has operation keys used for sending the print JOB data to the image forming apparatus 1, and a displaying portion. The displaying portion, for example, displays the tray/stacker selection ID input scene shown FIG. 5 and explained in embodiment 1.

Next, it is to explain operation of the image forming apparatus in the embodiment 5 of the present invention, till tray selection ID change table and stacker selection ID change table are made. Moreover, regarding operation to actually execute a print process after these tables are made, because it is the same as that in embodiment 1, its explanation is omitted.

Figure 27:
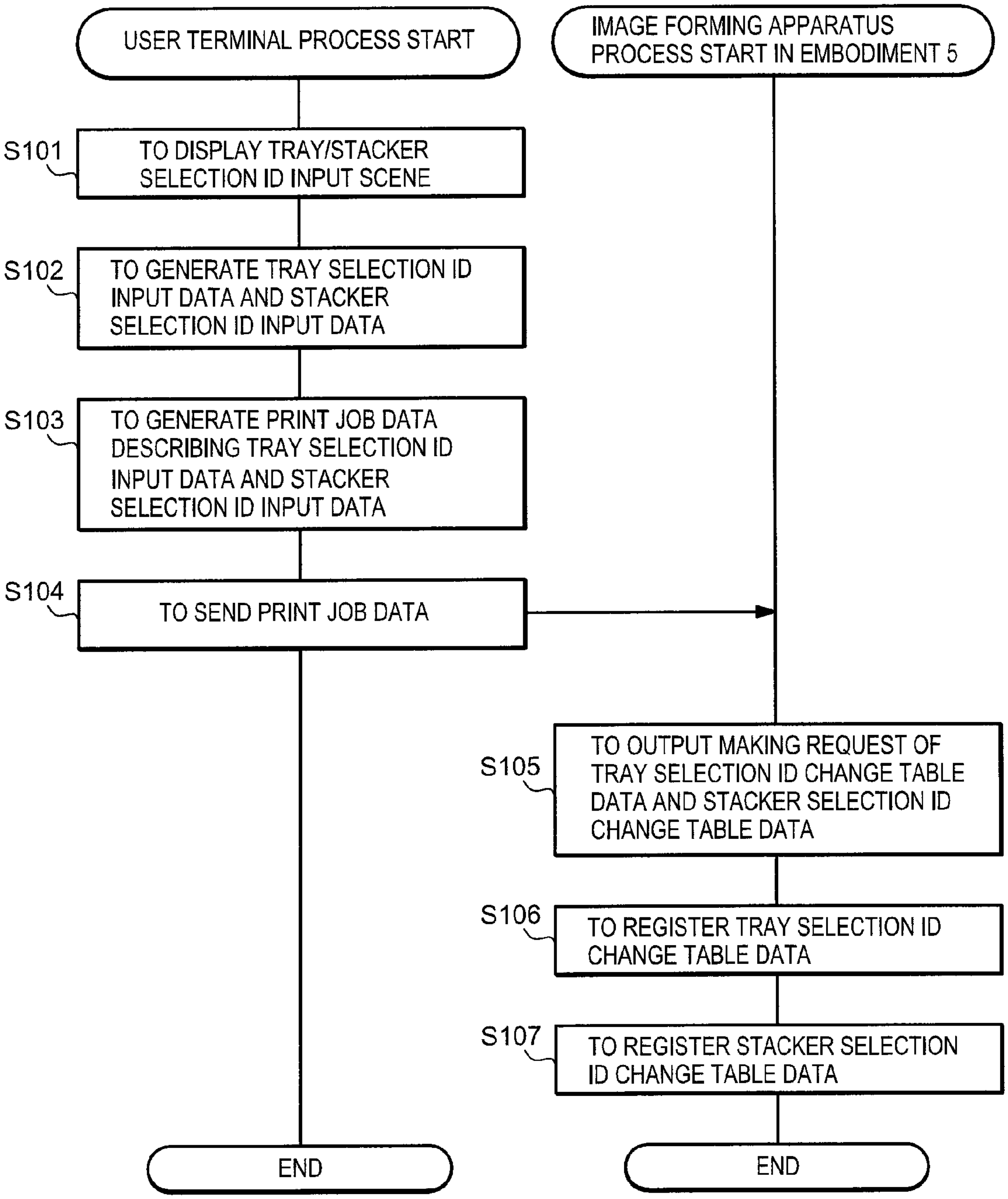
FIG. 27 is a flowchart for explaining operation of an image forming apparatus in embodiment 5 of the present invention.

FIG. 27 is a flowchart for explaining operation of an image forming apparatus in embodiment 5 of the present invention, till tray selection ID change table and stacker selection ID change table are made.

First, user uses the operation keys provided on the operating section 24 of the user terminal 2 to display a tray/stacker selection ID input scene shown by FIG. 5 on the operating section 24 (Step S101). After user inputted, for example, as shown by FIG. 5, "PCL" to the input column of emulation name; inputted execution apparatus tray selection IDs whose tray No. are from "1" to "6" and execution apparatus stacker selection IDs whose tray No. are from "1" to "5"; and clicked the OK button, the operating section 24 outputs the emulation name, the execution apparatus tray selection IDs of respective tray No., and the execution apparatus stacker selection IDs of respective stacker No., to the controlling section 22.

The controlling section 22, when received the emulation name, the execution apparatus tray selection IDs of respective tray No., and the execution apparatus stacker selection IDs of respective stacker No., from the operating section 24, generates tray selection ID input data and stacker selection ID input data (Step S102), and stores the tray selection ID input data and the stacker selection ID input data into the work area of the storing section 21.

In the tray selection ID input data generated by the controlling section 22, as shown by FIG. 5, 1) tray selection ID input data composed of emulation name of "PCL", tray No. of "1" and execution apparatus tray selection ID of "2"; 2) tray selection ID input data composed of emulation name of "PCL", tray No. of "2" and execution apparatus tray selection ID of "1"; 3) tray selection ID input data composed of emulation name of "PCL", tray No. of "3" and execution apparatus tray selection ID of "5"; 4) tray selection ID input data composed of emulation name of "PCL", tray No. of "4" and execution apparatus tray selection ID of "8"; 5) tray selection ID input data composed of emulation name of "PCL", tray No. of "5" and execution apparatus tray selection ID of "3"; and 6) tray selection ID input data composed of emulation name of "PCL", tray No. of "6" and execution apparatus tray selection ID of "9", are described.

In the stacker selection ID input data generated by the controlling section 22, as shown by FIG. 5, 1) stacker selection ID input data composed of emulation name of "PCL", stacker No. of "1" and execution apparatus stacker selection ID of "3"; 2) stacker selection ID input data composed of emulation name of "PCL", stacker No. of "2" and execution apparatus stacker selection ID of "5"; 3) stacker selection ID input data composed of emulation name of "PCL", stacker No. of "3" and execution apparatus stacker selection ID of "2"; 4) stacker selection ID input data composed of emulation name of "PCL", stacker No. of "4" and execution apparatus stacker selection ID of "1"; and 5) stacker selection ID input data composed of emulation name of "PCL", stacker No. of "5" and execution apparatus stacker selection ID of "4", are described.

Next, the controlling section 22, after the tray selection ID input data and the stacker selection ID input data are stored to the work area of the storing section 21, as shown by FIG. 26, describes information representing a making request of change table into process designation area, describes the tray selection ID change table data stored in the work area into the tray selection ID change table description area, and describes the stacker selection ID change table data stored in the work area into the stacker selection ID change table description area so as to generate print JOB data (Step S103); and outputs the print JOB data to the sending and receiving section 23 (Step S104).

The sending and receiving section 23 sends the print JOB data inputted from the controlling section 22 to the image forming apparatus 1 via the cable 4.

The I/F sending and receiving process portion 111 of the image forming apparatus 1, when received the print JOB data from the user terminal 2, makes the print JOB data be stored temporarily into the sending and receiving buffer 112*a* of the RAM memory 112; and outputs a notification representing that the print JOB data has been received to the analyzing/editing process portion 113.

Then, the analyzing/editing process portion 113 reads out the print JOB data from the sending and receiving buffer 112*a* and confirms that information indicating a table making request is described in the process designation area of the print JOB data, further outputs a making request to make a tray selection ID change table 118*c* and a stacker selection ID change table 118*d* to the change table making process portion 125 (Step S105).

The change table making process portion 125 reads out the tray selection ID change table data described in the sending and receiving buffer 112*a* of the RAM memory 112, and registers the tray selection ID change table data to the tray selection ID change table 118*c* (Step S106).

Continuously, the change table making process portion 125 reads out the stacker selection ID change table data described in the sending and receiving buffer 112*a* of the RAM memory 112, and registers the stacker selection ID change table data to the stacker selection ID change table 118*d* (Step S107). Then, the process is ended.

According to the embodiment 5, the controlling section 22 of the user terminal 2 generates the print JOB data in which the tray selection ID change table data and the stacker selection ID change table data are described, and sends the print JOB data to the image forming apparatus 1; the change table making process portion 125 of the image forming apparatus 1 generates the tray selection ID change table 118*c* and the stacker selection ID change table 118*d* on the basis of the received tray selection ID change table data and the received stacker selection ID change table data. Therefore, it is possible for user to perform the process for making the tray selection ID change table 118*c* and the stacker selection ID change table 118*d* from the user terminal 2.

Embodiment 6

Figure 28:
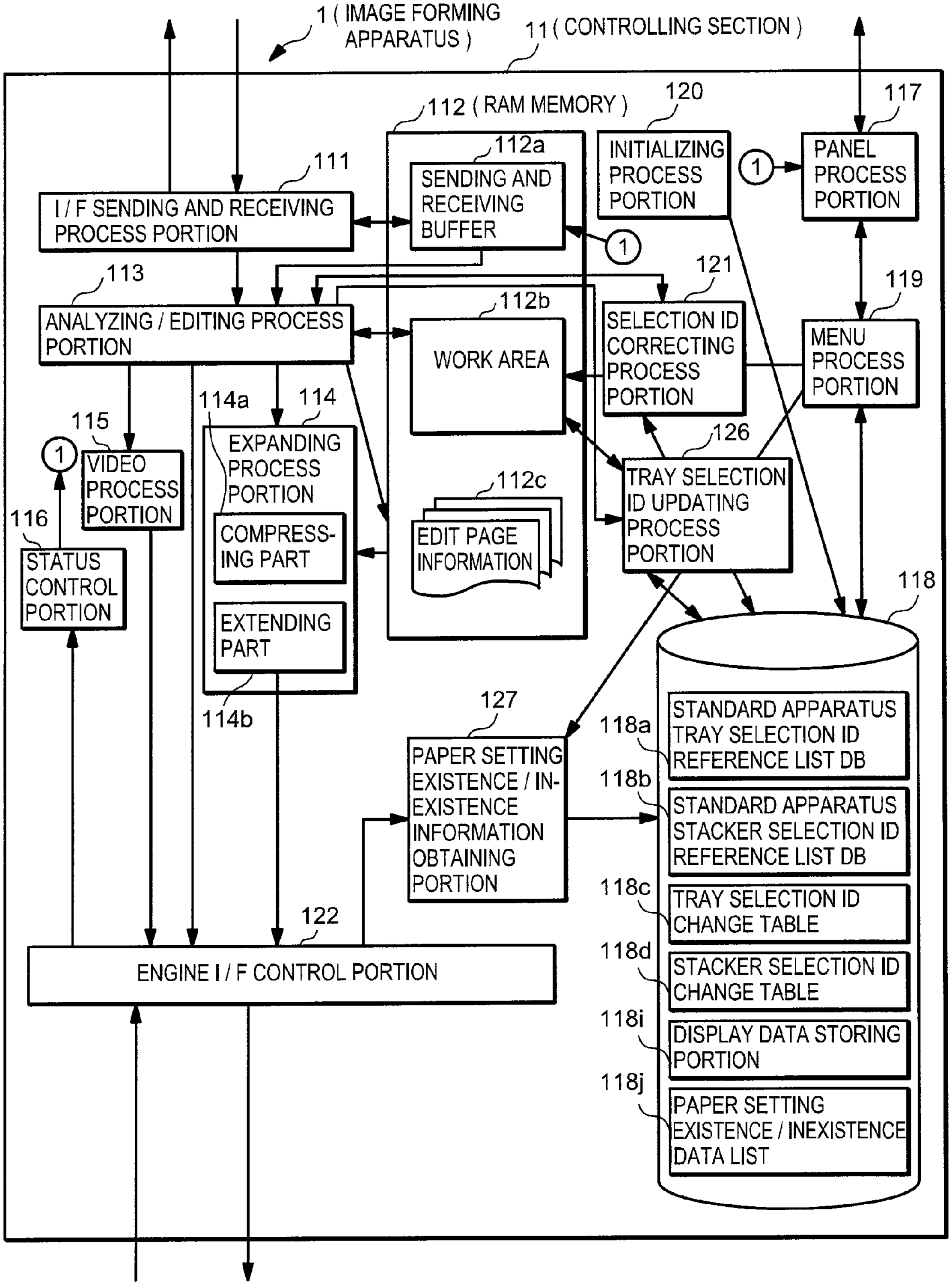
FIG. 28 is a block diagram showing a structure of controlling section in an image forming apparatus of embodiment 6 of the present invention.

FIG. 28 is a block diagram showing a structure of controlling section in an image forming apparatus of embodiment 6 of the present invention.

As shown by FIG. 28, an image forming apparatus 1 of the embodiment 6, similar to the image forming apparatus 1 of the embodiment 1, is connected with a user terminal 2 serving as an upper apparatus via network cable 4 such as Ethernet (registration trademark) or cable 4 such as Centronics, USB, RS232C and the like.

The image forming apparatus 1 of the embodiment 6, as shown by FIG. 2, comprises a controlling section 11, an engine control section 12, a paper feeding section 13, a paper ejecting section 14, a paper movement section 15, an operator panel section 16, and a print control section 17. Here, the engine control section 12, the paper feeding section 13, the paper ejecting section 14, the paper movement section 15, the operator panel section 16, and the print control section 17 have the same structure and function as that in embodiment 1.

As shown by FIG. 28, the controlling section 11 includes an I/F sending and receiving process portion 111, a RAM memory 112, an analyzing/editing process portion 113, an expanding process portion 114, a VIDEO process portion 115, a status control portion 116, a panel process portion 117, a non-volatility memory 118, a menu process portion 119, an initializing process portion 120, a selection ID correcting process portion 121, an engine I/F control portion 122, a tray selection ID updating process portion 126, and a paper setting existence/inexistence information obtaining portion 127. Here, the I/F sending and receiving process portion 111, the expanding process portion 114, the VIDEO process portion 115, the status control portion 116, the initializing process portion 120, the selection ID correcting process portion 121 and the engine I/F control portion 122 have the same structure and function as that in embodiment 1, so their explanations are omitted.

The RAM memory 112, except the function in embodiment 1, further has a function to store exclusive mode information (described below) to the work area 112*b*.

The analyzing/editing process portion 113, except the function in embodiment 1, further has a function to judge whether or not the exclusive mode information is stored in the work area 112*b* of the RAM memory 112; if the exclusive mode information is stored in the work area 112*b* of the RAM memory 112, outputs an instruction to update standard apparatus tray selection ID of the tray selection ID change table 118*c* to the tray selection ID updating process portion 126.

Figure 29:
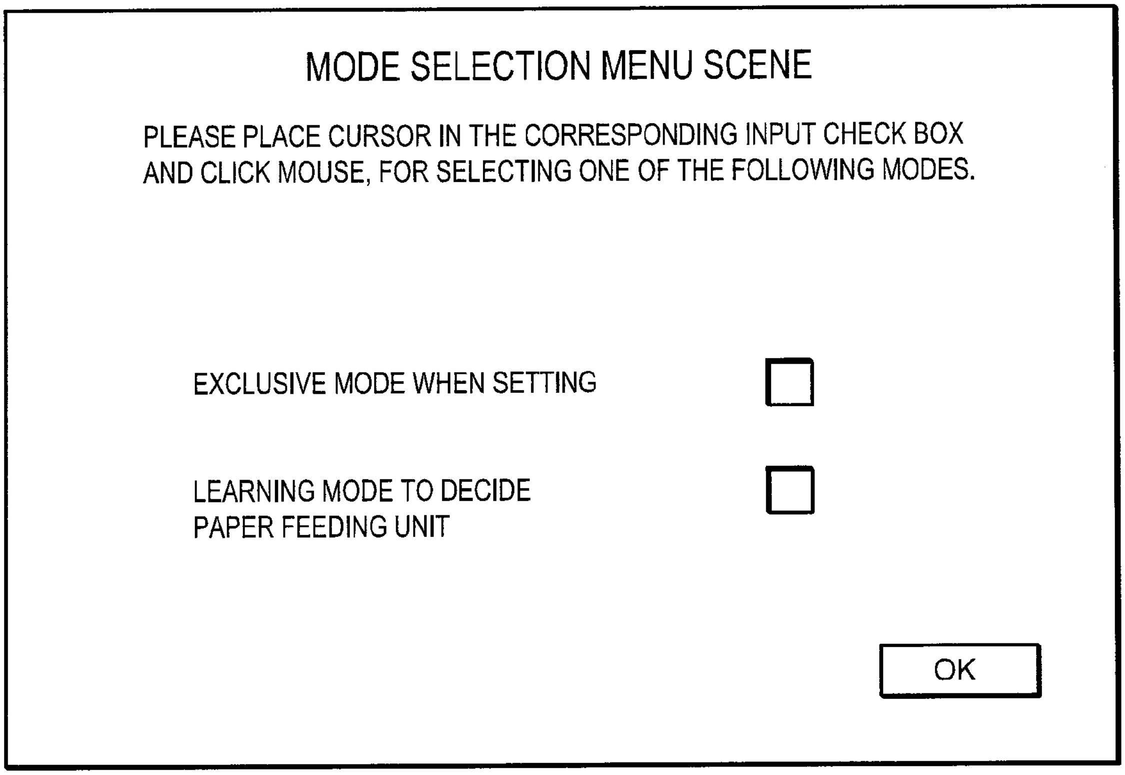
FIG. 29 is a diagram showing an example of mode selection menu scene.

FIG. 29 is a diagram showing an example of mode selection menu scene.

The panel process portion 117, outputs a notification representing that a check box of "Exclusive mode when setting" in a mode selection menu scene shown by FIG. 29 is clicked to the menu process portion 119, according to an input from the operator panel section 16.

The non-volatility memory 118 is formed from, for example, an EPROM, and includes a standard apparatus tray selection ID reference list DB 118*a*, a standard apparatus stacker selection ID reference list DB 118*b*, tray selection ID change table 118*c*, a stacker selection ID change table 118*d*, a display data storing portion 118*i*, and a paper setting existence/inexistence data list 118*j*. Here, the standard apparatus tray selection ID reference list DB 118*a*, the standard apparatus stacker selection ID reference list DB 118*b*, the tray selection ID change table 118*c*, the stacker selection ID change table 118*d*, and the display data storing portion 118*i* are the same as that in embodiment 1.

FIG. 30 is a diagram showing an example of paper setting existence/inexistence information data list.

The paper setting existence/inexistence data list 118*j*, as shown by FIG. 30, is a list to describe tray No. and information indicating whether paper is set in tray corresponding to the tray No.

The menu process portion 119, after received the notification representing that a check box of "Exclusive mode when setting" is clicked, identifies that a setting time exclusive mode is set, notifies the paper setting existence/inexistence information obtaining portion 127 of the setting time exclusive mode, and writes setting time exclusive mode information representing the setting time exclusive mode into the work area 112*b* of the RAM memory 112.

The tray selection ID updating process portion 126 refers to the paper setting existence/inexistence data list 118*j* in the non-volatility memory 118 according to the instruction outputted from the analyzing/editing process portion 113, and reads out a tray No. of a tray in which paper is set. Then, the tray selection ID updating process portion 126 reads out standard apparatus tray selection ID described in the print JOB data stored in the RAM memory 112.

Further, the tray selection ID updating process portion 126 writes the read out standard apparatus tray selection ID into the tray selection ID change table 118*c* in which the read out tray No. is described so as to replace the standard apparatus tray selection ID corresponding the tray No., and update the tray selection ID change table 118*c*, further outputs a notification representing update is ended to the analyzing/editing process portion 113.

For example, as shown by FIG. 30, in the case that the tray No. corresponding to tray in which paper has been set is "4" and the standard apparatus tray selection ID that has been read out is "9", the standard apparatus tray selection ID corresponding to the tray No. of "4" in the tray selection ID change table 118*c* shown by FIG. 7A, is changed from "2" to "9".

The paper setting existence/inexistence information obtaining portion 127 obtains paper setting existence/inexistence information representing paper existence/inexistence state in respective trays from sensors furnished in respective trays of the paper feeding section 13, via the engine control section 12 and the engine I/F control portion 122. Further, the paper setting existence/inexistence information obtaining portion 127 generates the paper setting existence/inexistence data list 118*j* shown by FIG. 30 into the non-volatility memory 118, from the obtained paper setting existence/inexistence information.

The displaying portion 161 of the operator panel section 16 displays the mode selection menu scene shown by FIG. 29.

The paper feeding section 13 includes sensor which is used to detect the setting of paper and is furnished in tray.

Next, it is to explain operation of the image forming apparatus in the embodiment 6 of the present invention.

Figure 31A:
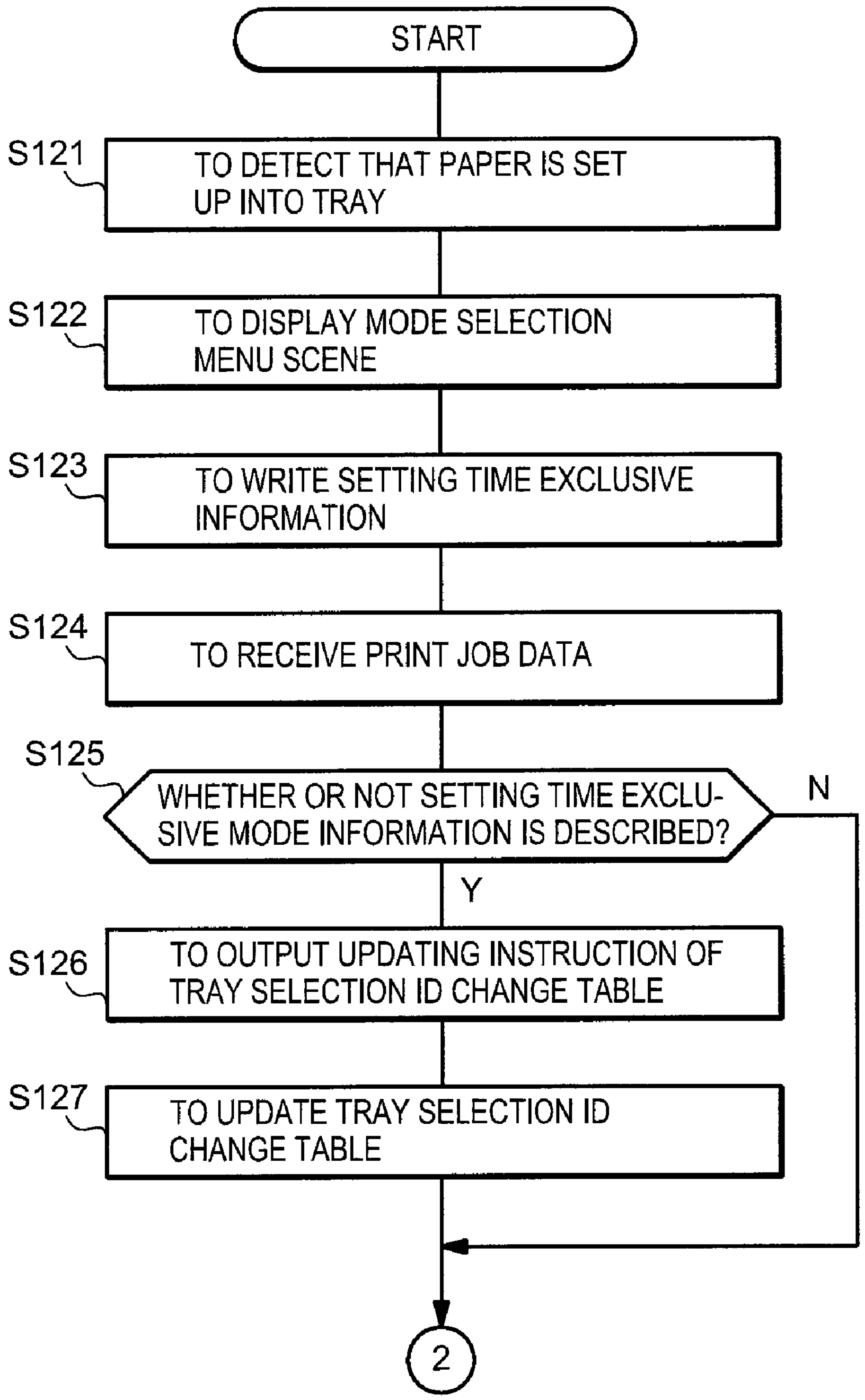
FIG. 31A is a flowchart for explaining operation of an image forming apparatus in embodiment 6 of the present invention (I).
Figure 31B:
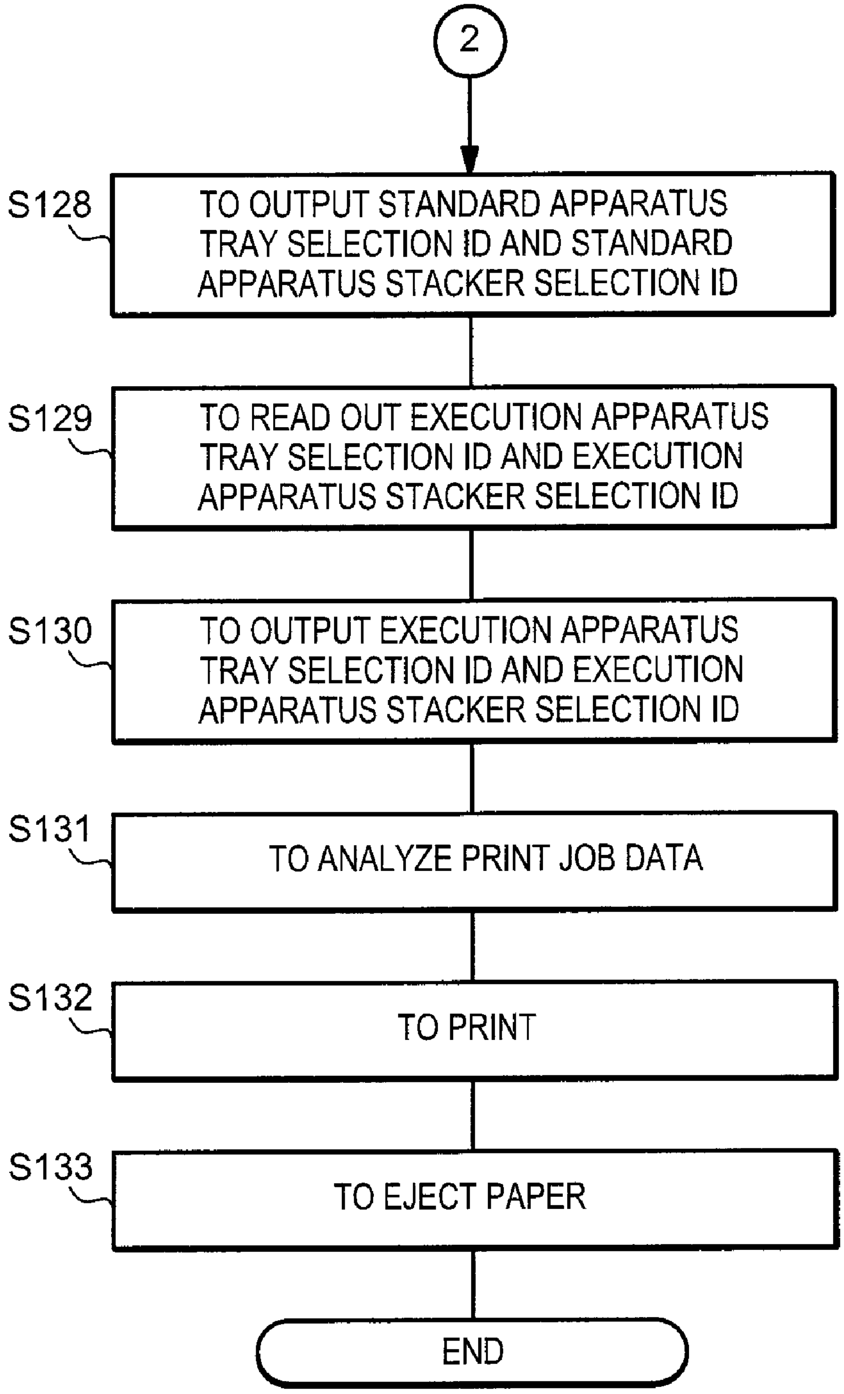
FIG. 31B is a flowchart for explaining operation of an image forming apparatus in embodiment 6 of the present invention (II).

FIG. 31A is a flowchart for explaining operation of an image forming apparatus in embodiment 6 of the present invention (I); and FIG. 31B is a flowchart for explaining operation of an image forming apparatus in embodiment 6 of the present invention (II).

First, paper is only set in tray used when updating standard apparatus tray selection ID by user. Then, sensor (not shown) furnished in the tray detects that paper is set (Step S121).

Next, user uses operation keys in the operating portion 162 of the operator panel section 16 to display the mode selection menu scene shown by FIG. 29 on the displaying portion 161 (Step S122). After the check box of "Exclusive mode when setting" in the mode selection menu scene is clicked by user the OK button is clicked, the operator panel section 16 outputs a notification representing that the notification representing that the check box of "Exclusive mode when setting" is clicked to the panel process portion 117.

The panel process portion 117, when received the notification from the operator panel section 16, outputs the notification to the menu process portion 119.

The menu process portion 119, when received the notification representing that the check box of "Exclusive mode when setting" is clicked from the panel process portion 117, writes setting time exclusive mode information representing setting time exclusive mode into the work area 112*b* of the RAM memory 112 (Step S123), and notifies the paper setting existence/inexistence information obtaining portion 127 of the state of the setting time exclusive mode.

Next, the paper setting existence/inexistence information obtaining portion 127, after received the notification from the menu process portion 119, obtains paper setting existence/inexistence information representing paper existence/inexistence state in respective trays from sensors furnished in respective trays of the paper feeding section 13, via the engine control section 12 and the engine I/F control portion 122. Further, the paper setting existence/inexistence information obtaining portion 127 generates the paper setting existence/inexistence data list 118*j* shown by FIG. 30 into the non-volatility memory 118, by using the obtained paper setting existence/inexistence information. Moreover, the paper setting existence/inexistence data list 118*j* shown by FIG. 30 indicates that paper is set only in the tray whose tray No. is "4".

Later, the I/F sending and receiving process portion 111, when received print JOB data from the user terminal 2 via the cable 4 (Step S124), makes the sending and receiving buffer 112*a* in the RAM memory 112 store the received print JOB data, and outputs a notification representing that the print JOB data is received to the analyzing/editing process portion 113.

Next, the analyzing/editing process portion 113 confirms whether or not the setting time exclusive mode information is stored in the work area 112*b* of the RAM memory 112 (Step S125).

On the one hand, The analyzing/editing process portion 113, if judged that the setting time exclusive mode information is not stored in the work area 112*b* of the RAM memory 112 (Step S125, NO), moves to process step S128.

On the other hand, the analyzing/editing process portion 113, if judged that the setting time exclusive mode information is stored in the work area 112*b* of the RAM memory 112 (Step S125, YES), reads out the standard apparatus tray selection ID and the standard apparatus stacker selection ID from the print JOB data stored in the sending and receiving buffer 112*a*; writes the standard apparatus tray selection ID and the standard apparatus stacker selection ID that have been read out, into the work area 112*b* of the RAM memory 112; and outputs an instruction to the tray selection ID updating process portion 126 to for updating the tray selection ID change table 118*c* shown by FIG. 30, in the non-volatility memory 118 (Step S126).

The tray selection ID updating process portion 126, after received the instruction from the analyzing/editing process portion 113, refers to the paper setting existence/inexistence data list 118*j* in the non-volatility memory 118 according to the instruction outputted from the analyzing/editing process portion 113, and reads out the tray No. of the tray in which paper is set. Then, the tray selection ID updating process portion 126 reads out the standard apparatus tray selection ID described in the print JOB data stored in the work area 112*b* of the RAM memory 112.

Later, the tray selection ID updating process portion 126 writes the read out standard apparatus tray selection ID (Step S127) into the tray selection ID change table 118*c* in which the read out tray No. is described so as to replace the standard apparatus tray selection ID corresponding the tray No.; and update the tray selection ID change table 118*c*; further outputs a notification representing update is ended to the analyzing/editing process portion 113.

Next, the analyzing/editing process portion 113 outputs the standard apparatus tray selection ID and the standard apparatus stacker selection ID that are stored in the work area 112*b* to the selection ID correcting process portion 121 (Step S128).

The selection ID correcting process portion 121, after received the standard apparatus tray selection ID and the standard apparatus stacker selection ID from the analyzing/editing process portion 113, reads out the execution apparatus tray selection ID corresponding to the standard apparatus tray selection ID from the tray selection ID change table 118*c* (refer to FIG. 7A), and reads out the execution apparatus stacker selection ID corresponding to the standard apparatus stacker selection ID from the stacker selection ID change table 118*d* (refer to FIG. 7B) (Step S129). Next, the selection ID correcting process portion 121 outputs the execution apparatus tray selection ID and the execution apparatus stacker selection ID that have been read out to the analyzing/editing process portion 113.

The analyzing/editing process portion 113, after received the execution apparatus tray selection ID and the execution apparatus stacker selection ID, outputs the execution apparatus tray selection ID and the execution apparatus stacker selection ID to the engine I/F control portion 122 (Step S130). Next, the analyzing/editing process portion 113 reads out the print JOB data stored in the sending and receiving buffer 112*a* of the RAM memory 112, analyzes the print JOB data (Step S131), and outputs medium thickness and print resolution described in the print JOB data to the VIDEO process portion 115.

After that, the analyzing/editing process portion 113 reads out edit size described in the print JOB data, generates edit page information obtained by editing drawing data described in the print JOB data on the basis of the edit size, writes the edit page information into the edit page information storing area 112*c* of the RAM memory 112, and outputs an execution request of expanding process to the expanding process portion 114.

The VIDEO process portion 115 generates print control parameter to designate image quality and the like on the basis of the medium thickness and the print resolution inputted from the analyzing/editing process portion 113; and outputs the print control parameter to the engine I/F control portion 122.

The expanding process portion 114, when received the execution request from the analyzing/editing process portion 113, reads out the edit page information stored in the edit page information storing area 112*c* of the RAM memory 112; makes print image data according to the edit page information, as raster data; and compresses/extends the print image data; then outputs the compressed/extended print image data to the engine I/F control portion 122.

The engine I/F control portion 122 outputs the print image data inputted from the expanding process portion 114 and the print control parameter that is inputted from the VIDEO process portion 115 and is used to prescribe print quality and the like to the print control section 17, and outputs the execution apparatus tray selection ID and the execution apparatus stacker selection ID that are inputted from the analyzing/editing process portion 113 to the engine control section 12.

The engine control section 12, after received the execution apparatus tray selection ID and the execution apparatus stacker selection ID from the engine I/F control portion 122, drives motor to suitably rotate the photosensitive drum 15*a*, the transferring roller 15*c*, the fixing roller 15*e*, the pickup roller 15*f*, the registration roller 15*g*, the idle roller 15*h*, the drive roller 15*i*, the conveying roller 15*j*, and the ejecting roller 15*k*.

Thus, the pickup roller 15*f* designated by the engine control section 12 takes out paper from tray designated by the execution apparatus tray selection ID, and the registration roller 15*g* conveys the paper that has been taken out to the photosensitive drum 15*a*.

Later, the print control section 17, when received print image data, medium thickness and print control parameter inputted from the engine I/F control portion 122, controls the charging unit to supply minus charge to the photosensitive drum 15*a*, controls the exposing unit 15*b* to emit light to form an electrostatic latent image onto the photosensitive drum 15*a*, controls the developing unit to use developer of toner with minus charge to make the electrostatic latent image formed on the photosensitive drum 15*a* become visible, then, controls the transferring unit to transfer toner image onto paper. Furthermore, the print control section 17 controls the fixing device 15*d* to fix the toner image transferred on the paper (Step S132).

Later, the paper movement section 15 conveys the paper on which the print image data is printed to the paper ejecting section 14.

The paper ejecting section 14 ejects the printed paper to the stacker corresponding to the execution apparatus stacker selection ID (Step S133). Then, the process is ended.

According to the embodiment 6, the tray selection ID updating process portion 126 updates the standard apparatus tray selection ID that is stored in the tray selection ID change table 118*c* and corresponds to the tray No. obtained by the paper setting existence/inexistence information obtaining portion 127 into the standard apparatus tray selection ID described in the print JOB data inputted from the user terminal 2, so it is possible to simply change the tray selection ID change table 118*c* for user.

The Utilization Possibility in Industry:

In the above stated explanation, only such case is explained that the present invention is applied to a printer, as common document printing apparatus. However, the present invention is not limited in this case, the present invention also can be applied to various devices such as scanner, copying apparatus, facsimile apparatus, multiplex apparatus having two functions or over and the like, also as common document printing apparatus.

The present invention is not limited to the foregoing embodiments but many modifications and variations are possible within the spirit and scope of the appended claims of the invention.

What is claimed is:

1. An image forming apparatus which has a plurality of medium accommodating sections, comprising:

a first storing section that stores accommodating section selection data correspondence information in which first medium accommodating section selection data assigned to another image forming apparatus corresponds to second medium accommodating section selection data assigned to the image forming apparatus;

a receiving section that receives the first medium accommodating section selection data and image data from an upper apparatus;

a correcting section that corrects the first medium accommodating section selection data received from the upper apparatus into second medium accommodating section selection data on the basis of the accommodating section selection data correspondence information stored in the first storing section; and a selecting section that selects a medium accommodating section on the basis of the second medium accommodating section selection data obtained by the correcting section.

2. The image forming apparatus according to claim 1, further comprising:

a displaying section that displays a first display scene to input the second medium accommodating section selection data;

a second storing section that stores the first medium accommodating section selection data;

an accommodating section selection data correspondence information generating section that generates the accommodating section selection data correspondence information in which the first medium accommodating section selection data stored in the second storing section corresponds to the second medium accommodating section selection data inputted to the display scene, with respect to respective medium accommodating sections; and a registering section that registers the accommodating section selection data correspondence information generated by the accommodating section selection data correspondence information generating section to the first storing section.

3. The image forming apparatus according to claim 2, further comprising:

a third storing section, wherein the displaying section displays a second display scene to input the image forming apparatus medium accommodating section name corresponding to another apparatus medium accommodating section name, except the first display scene;

wherein the third storing section stores medium accommodating section name correspondence information in which the image forming apparatus medium accommodating section name corresponds to the second medium accommodating section selection data of the image forming apparatus; and the accommodating section selection data correspondence information generating section generates the accommodating section selection data correspondence information in which the first medium accommodating section selection data stored in the second storing section corresponds to the second medium accommodating section selection data that is obtained by referring to the medium accommodating section name correspondence information stored in the third storing section and that corresponds to the image forming apparatus medium accommodating section name inputted to the second display scene, with respect to respective medium accommodating sections.

4. The image forming apparatus according to claim 3, further comprising:

a display data receiving section that receives display data for displaying the second display scene from the upper apparatus, wherein displaying section displays the second display scene by using the display data received by the display data receiving section.

5. The image forming apparatus according to claim 1, further comprising:

a medium accommodating section detecting section that detects medium accommodating section in which medium is accommodated;

a medium accommodating section name obtaining section that obtains medium accommodating section name of the medium accommodating section obtained by the medium accommodating section name obtaining section; and a medium accommodating section selection data changing section that changes the first medium accommodating section selection data corresponding to the apparatus medium accommodating section name obtained by the apparatus medium accommodating section name obtaining section and stored in the first storing section, into first medium accommodating section selection data received from the upper apparatus.

6. The image forming apparatus according to claim 5, further comprising:

a reference information receiving section that receives reference information used as reference when using a first display scene in which respective medium accommodating sections are related to the second medium accommodating section selection data used for selecting the medium accommodating section, to input second medium accommodating section selection data which is assigned to the image forming apparatus, from the upper apparatus; and a printing section that prints the reference information received by the reference information receiving section and prints image data received from the upper apparatus.

7. The image forming apparatus according to claim 1, wherein the medium accommodating section is either of a paper feeding tray and a paper ejecting stacker.

8. An image forming system, comprising:

an upper apparatus; and an image forming apparatus which has medium accommodating sections, wherein the upper apparatus includes:

a displaying section that displays a display scene to input second medium accommodating section selection data assigned to the image forming apparatus;

a first storing section that stores first medium accommodating section selection data assigned to other image forming apparatus;

an accommodating section selection data correspondence information generating section that generates accommodating section selection data correspondence information in which the first medium accommodating section selection data stored in the first storing section is related to the second medium accommodating section selection data inputted to the display scene, with respect to respective medium accommodating sections; and a sending section that sends the accommodating section selection data correspondence information generated by the accommodating section selection data correspondence information generating section, to the image forming apparatus; and wherein the image forming apparatus includes:

a registering section that registers the accommodating section selection data correspondence information received from the upper apparatus;

a correcting section that corrects the first medium accommodating section selection data received from the upper apparatus into second medium accommodating section selection data on the basis of the accommodating section selection data correspondence information stored in the registering section; and a selecting section that selects medium accommodating section on the basis of the second medium accommodating section selection data obtained by the correcting section.

9. The image forming system according to claim 8, wherein the medium accommodating section is either of a paper feeding tray and a paper ejecting stacker.

* * * * *